US012749957B2

(12) United States Patent
Takahashi et al.

(10) Patent No.: US 12,749,957 B2
(45) Date of Patent: Sep. 29, 2026

(54) HAPTIC FEELING PRESENTING DEVICE

(71) Applicant: MINEBEA MITSUMI INC., Nagano (JP)

(72) Inventors: Yuki Takahashi, Tokyo (JP); Tomoya Ishitani, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 204 days.

(21) Appl. No.: 18/722,100

(22) PCT Filed: Dec. 14, 2022

(86) PCT No.: PCT/JP2022/046009
§ 371 (c)(1),
(2) Date: Jun. 20, 2024

(87) PCT Pub. No.: WO2023/120312
PCT Pub. Date: Jun. 29, 2023

(65) Prior Publication Data

US 2026/0088691 A1 Mar. 26, 2026

(30) Foreign Application Priority Data

Dec. 24, 2021 (JP) ................................. 2021-210880

(51) Int. Cl.
*H02K 33/18* (2006.01)
*H02K 33/00* (2006.01)
(Continued)

(52) U.S. Cl.
CPC ............. *H02K 33/18* (2013.01); *H02K 33/00* (2013.01); *G06F 3/016* (2013.01); *G06F 3/044* (2013.01)

(58) Field of Classification Search
CPC .......... H02K 1/34; H02K 33/00; H02K 33/02; H02K 33/04; H02K 33/08; H02K 33/10;
(Continued)

(56) References Cited

U.S. PATENT DOCUMENTS

2018/0081446 A1* 3/2018 Wakuda .................. G06F 3/038
2021/0149491 A1 5/2021 Takahashi et al.
2022/0300078 A1* 9/2022 Sato ........................ G06F 3/041

FOREIGN PATENT DOCUMENTS

JP 2014071652 A 4/2014
JP 2017004261 A 1/2017
(Continued)

OTHER PUBLICATIONS

Furuki Seiya, Vibration Presentation Device, Oct. 22, 2020, JP 2020173695 (English Machine Translation) (Year: 2020).*
(Continued)

*Primary Examiner* — Alexander A Singh
(74) *Attorney, Agent, or Firm* — The Roy Gross Law Firm, LLC; Roy D. Gross

(57) ABSTRACT

A tactile-sensation presenting device according to the present invention is provided with: a holding part that makes it possible to hold an operable appliance that is operated by an operator by touching; a vibratory actuator that includes a movable member supporting the holding part and a fixed member supporting the movable member so as to allow elastic vibration along a vibration direction, the vibratory actuator driving the movable member in one direction along the vibration direction to generate vibration, which causes a tactile sensation to be given to the operator via the operable appliance; a base to which the fixed member of the vibratory actuator is fixed; and an attenuating part disposed in a state of contact with each of the holding part and the base.

12 Claims, 16 Drawing Sheets

(51) Int. Cl.
*G06F 3/01* (2006.01)
*G06F 3/044* (2006.01)

(58) Field of Classification Search
CPC ........ H02K 33/12; H02K 33/14; H02K 33/16; H02K 33/18; G06F 3/016; G06F 3/044
USPC ............... 310/12.01, 12.16, 12.21, 12.24, 28
See application file for complete search history.

(56) References Cited

FOREIGN PATENT DOCUMENTS

| | | | | | |
|---|---|---|---|---|---|
| JP | 2020071674 | A | | 5/2020 | |
| JP | 2020089238 | A | * | 6/2020 | ............. G06F 3/016 |
| JP | 2020173695 | A | * | 10/2020 | |
| JP | 2021081876 | A | | 5/2021 | |

OTHER PUBLICATIONS

Takahashi et al, Control Device, Jun. 4, 2020, JP 2020089238 (English Machine Translation) (Year: 2020).*
Japan Patent Office, Decision of Refusal in Corresponding Japanese Patent Application No. 2021-210880, dated Oct. 10, 2025, 4pp.
PCT International Search Report for International Application No. PCT/JP2022/046009, mailed Mar. 7, 2023, 5pp.
PCT Written Opinion for International Application No. PCT/JP2022/046009, mailed Mar. 7, 2023, 4pp.

* cited by examiner

HAPTIC FEELING PRESENTING DEVICE

CROSS REFERENCE TO RELATED APPLICATIONS

This application is a National Phase of PCT Patent Application No. PCT/JP2022/046009 having International filing date of Dec. 14, 2022, which claims the benefit of priority of Japanese Patent Application No. 2021-210880, filed Dec. 24, 2021, the contents of which are all incorporated herein by reference in their entirety.

TECHNICAL FIELD

The present invention relates to a haptic feeling presenting device.

BACKGROUND ART

There has been known a haptic feeling presenting device that applies, as a touch operation feeling (haptic feeling) resulting from a touch operation, vibration by a vibration actuator to a finger pad or the like of an operator who has touched an operation surface of a touch panel when the touch panel is operated.

For example, Patent Literature (hereinafter, referred to as "PTL") 1 discloses a haptic feeling presenting device including an operation detecting part that detects an operation amount of an operation on an operation surface of a panel, an actuator that applies vibration to the operation surface, and a control part that performs drive control of the actuator based on a result of the operation detecting part. The haptic feeling presenting device disclosed in PTL 1 performs, as presentation of vibration of a natural strength, haptic feeling presentation in which uncomfortable feeling felt by a user is reduced by changing modes of the drive control of the actuator depending on the amount of change in the operation amount at the time of a release operation.

CITATION LIST

Patent Literature

PTL 1

Japanese Patent Application Laid-Open No. 2020-071674

SUMMARY OF INVENTION

Technical Problem

Incidentally, the haptic feeling presenting device as disclosed in PTL 1 has a problem that, when the vibration generated by the actuator is damped too lightly, stronger vibration persists and the haptic feeling deteriorates.

An object of the present invention is to provide a haptic feeling presenting device capable of suppressing the persistence of vibration and improving the haptic feeling.

Solution to Problem

A haptic feeling presenting device according to the present invention includes:

- a holding part capable of holding operation equipment on which a touch operation by an operator is performed;
- a vibration actuator that includes a movable body supporting the holding part, and a fixed body supporting the movable body such that the movable body is capable of elastically vibrating in a vibration direction, the vibration actuator being configured to drive the movable body in one direction of the vibration direction to generate a vibration as a haptic feeling applied to the operator via the operation equipment;
- a base part to which the fixed body of the vibration actuator is fixed; and
- a damper disposed in contact with each of the holding part and the base part.

Advantageous Effects of Invention

According to the present invention, it is possible to improve a haptic feeling by suppressing vibration persistence.

DESCRIPTION OF EMBODIMENTS

Hereinafter, embodiments of the present invention will be described in detail with reference to the drawings.

An orthogonal coordinate system (X, Y, Z) is used for the description in the present embodiment. The same orthogonal coordinate system (X, Y, Z) is also used for illustration of below-mentioned figures. In the following description, the widths, depths, and heights of haptic feeling presenting devices 100A to 100E are lengths in the X-direction, the Y-direction, and the Z-direction, respectively. The widths, depths, and heights of electromagnetic actuator 10 included in haptic feeling presenting devices 100A to 100E are also defined as lengths in the X-direction, the Y-direction, and the Z-direction, respectively.

Note that the positive side in the Z-direction is a direction in which vibration feedback is given to an operator, and is described as "upper side" or "front side", and the negative side in the Z-direction is a direction in which the operator presses for operation, and is described as "lower side" or "back side". In addition, the surfaces of parts constituting haptic feeling presenting devices 100A to 100E on the "upper side" or the "front side" are described as the "upper surfaces" or the "front surfaces", and the surfaces on the "lower side" or the "back side" are described as the "lower surfaces" or the "back surfaces".

[Haptic Feeling Presenting Device]

Haptic feeling presenting device 100A according to the present embodiment will be described with reference to FIGS. 1 to 4.

Figure 1:
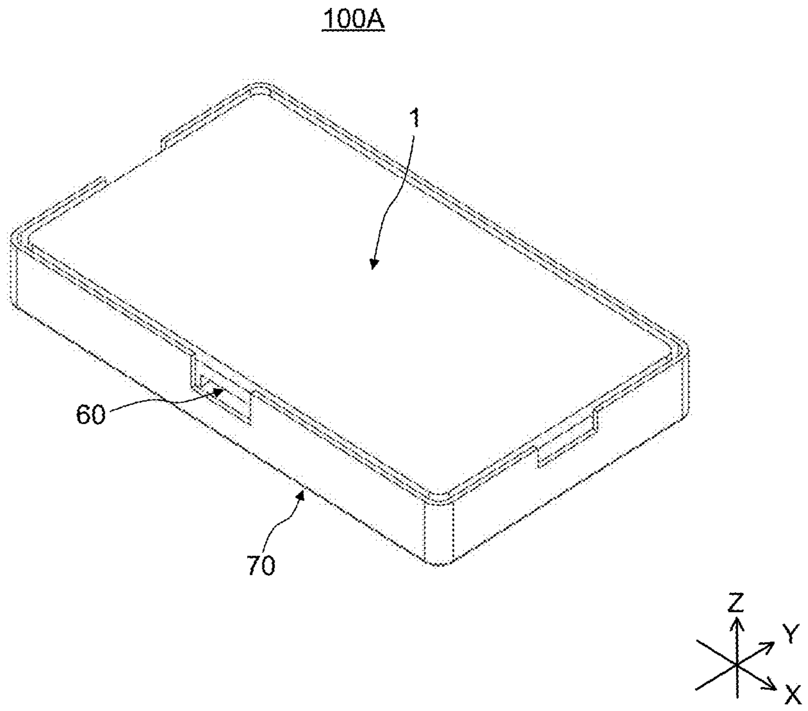
FIG. 1 is a perspective view of a haptic feeling presenting device according to an embodiment of the present invention.
Figure 2:
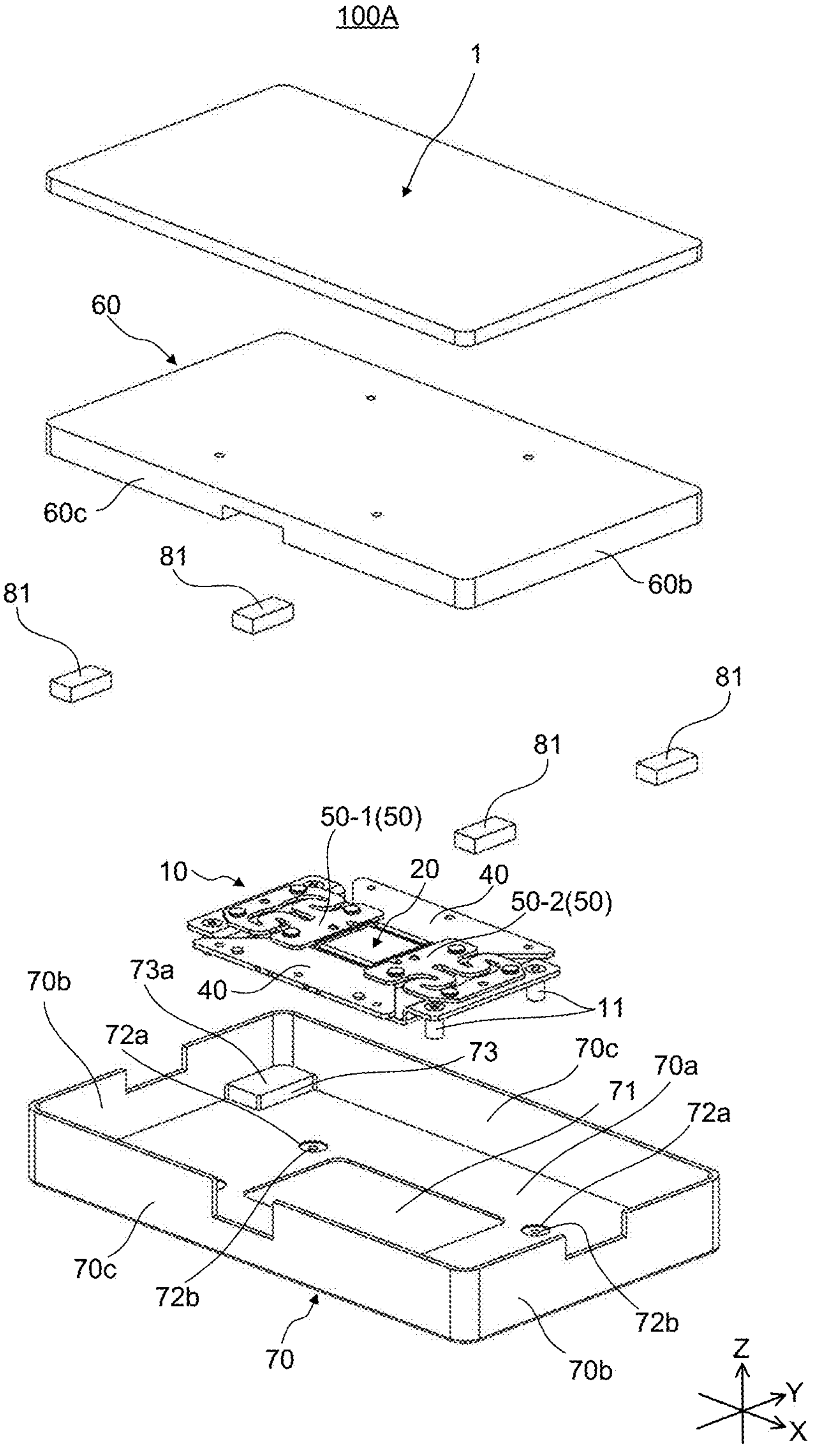
FIG. 2 is an exploded perspective view of the haptic feeling presenting device according to an embodiment of the present invention.
Figure 3:
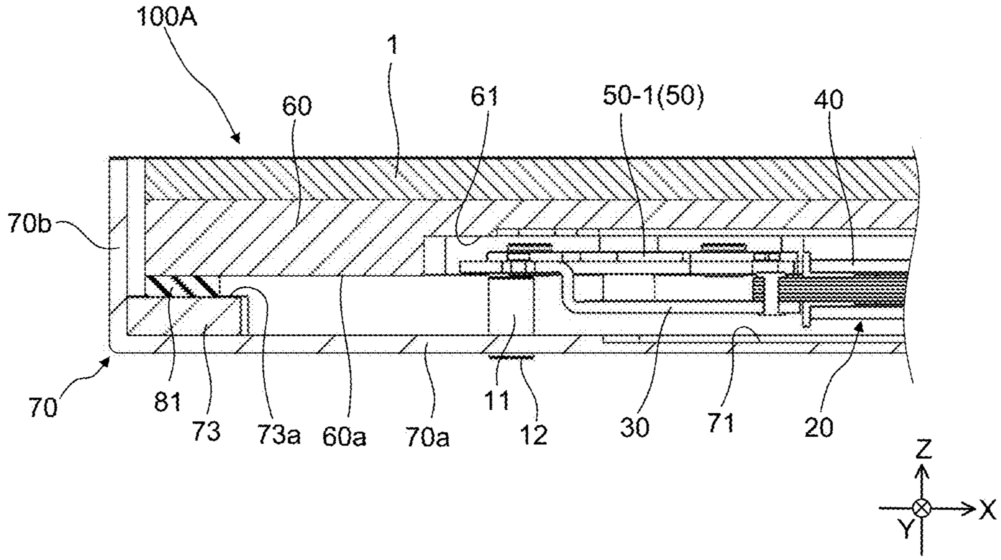
FIG. 3 is a partial sectional view illustrating a principal part configuration of the haptic feeling presenting device illustrated in FIG. 1.
Figure 4:
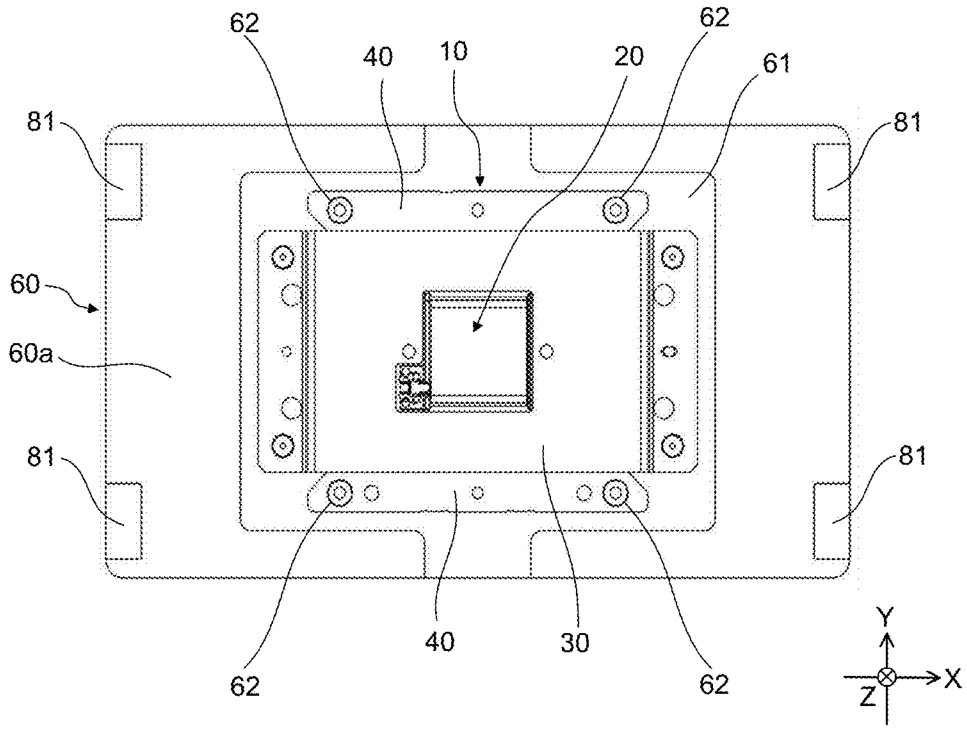
FIG. 4 is a view of a vibration actuator and a holding part of the haptic feeling presenting device illustrated in FIG. 1 as viewed from a bottom surface side.

FIG. 1 is a perspective view illustrating haptic feeling presenting device 100A. FIG. 2 is an exploded perspective view of a principal configuration of haptic feeling presenting device 100A as viewed from an obliquely upper side. FIG. 3 is a partial sectional view illustrating a configuration of a principal part of haptic feeling presenting device 100A. FIG. 4 is a bottom view of electromagnetic actuator 10 and holding part 60 of haptic feeling presenting device 100A.

Haptic feeling presenting device 100A is a device that applies, using a vibration actuator, a haptic feeling (also referred to as "haptic sensation" or "force sensation") as a touch operation sensation to an operator who operates operation equipment by touching the operation equipment depending on applications and use states of the operation equipment.

In the present embodiment, as illustrated in FIGS. 1 and 2, haptic feeling presenting device 100A includes touch panel 1 that is an example of the operation equipment, electromagnetic actuator 10 that is an example of the vibration actuator, holding part 60, accommodating base part 70, damper 81, and the like.

<Operation Equipment>

In the present embodiment, the operation equipment is, for example, touch panel 1. Touch panel 1 has an operation surface, and is operated when the operator touches the operation surface. Touch panel 1 also functions as a haptic feeling presenting part or a vibration presenting part that applies, to the operator who performs a touch operation on the operation surface, a vibration causing a haptic feeling.

Touch panel 1 is a capacitive touch panel, a resistive touch panel, an optical touch panel, or the like. In the present embodiment, touch panel 1 is, for example, a capacitive touch panel. Touch panel 1 detects a touch position of the operator, and a device control part (not illustrated) of haptic feeling presenting device 100A obtains information on the touch position via a touch panel control part (not illustrated) of touch panel 1 to control touch panel 1. In addition, movable body 40 of electromagnetic actuator 10 is driven by the device control part based on the information on the touch position obtained as described above, and vibration as a haptic feeling is applied to the operator who performs the touch operation on the operation surface.

The configuration of a display of touch panel 1 that displays an image on the operation surface is a liquid crystal system, an organic EL system, an electronic paper system, a plasma system, or the like. The device control part controls display information to display an image corresponding to the type of the haptic feeling on the operation surface of the display to present the image to the operator. Note that the above-described control of touch panel 1 may be controlled by the touch panel control part.

Such a haptic feeling presenting device 100A is used, for example, as a touch panel device of a car navigation system as electronic equipment. Haptic feeling presenting device 100A may be any electronic equipment which applies a haptic feeling to an operator by applying a vibration force to the operator touching an operation target. For example, haptic feeling presenting device 100A may be an image-display device such as a smartphone, a tablet-type computer, or a television, a game machine with a touch panel, a game control part with a touch panel, or the like.

In haptic feeling presenting device 100A, operation equipment which does not have any displaying function and which is simply operable by an operator touching it may be used instead of touch panel 1 as the operation equipment.

<Holding Part>

Holding part 60 is a member capable of holding touch panel 1, and the back surface side of touch panel 1 is fixed to the front surface side of holding part 60 by, for example, an adhesive, a screw, or the like.

Holding part 60 is a rectangular flat plate member. Holding part 60 is a flat plate member for reducing the height and thickness of haptic feeling presenting device 100A, but is configured to have a higher rigidity than touch panel 1. For example, in the case where touch panel 1 is made of a resin-based material, holding part 60 is made of a metal material such as aluminum having a Young's modulus higher than that of touch panel 1, so that its rigidity is higher. Further, the thickness of holding part 60 in the Z-direction may be made thicker than that of touch panel 1, for example, so that the rigidity of holding part 60 is higher.

As will be described later, the back surface side of holding part 60 is in contact with dampers 81. In a case where the rigidity of holding part 60 is low, there is a possibility that holding part 60 is deflected when holding part 60 is driven, and the damping of vibration by dampers 81 becomes unstable. Unlike this, the rigidity of holding part 60 is high in the present embodiment. It is thus possible to suppress deflection of holding part 60 to stabilize the damping of the vibration by dampers 81 and also to stabilize the haptic feeling.

As illustrated in FIG. 3, upper recessed portion 61 recessed toward the front surface side is formed in the back surface side of holding part 60. As illustrated in FIG. 4, upper recessed portion 61 is larger than the size of electromagnetic actuator 10 in plan view. Therefore, it is possible to accommodate a part of the upper side of electromagnetic actuator 10 in upper recessed portion 61, to reduce the height of haptic feeling presenting device 100A.

As illustrated in FIG. 4, the back surface side of holding part 60 is connected to movable body 40 of electromagnetic actuator 10 using screws 62. As illustrated in FIG. 3, fixed body 30 of electromagnetic actuator 10 is connected to accommodating base part 70 (base part) via support columns 11 using screws 12. That is, holding part 60 capable of holding touch panel 1 is connected to and supported by accommodating base part 70 via electromagnetic actuator 10.

With such a connection, touch panel 1, holding part 60, and movable body 40 can be driven integrally, and vibration is applied by electromagnetic actuator 10.

<Base Part>

Accommodating base part 70 (the base part in the present invention) is a member for accommodating touch panel 1, holding part 60, and electromagnetic actuator 10 inside.

Accommodating base part 70 has a shape of a bottomed rectangular cylinder. Accommodating base part 70 has bottom portion 70*a*, first side surfaces 70*b*, and second side surfaces 70*c*, in which first side surfaces 70*b* are disposed on a pair of opposite sides of rectangular bottom portion 70*a*, and second side surfaces 70*c* are disposed on the other pair of opposite sides.

Bottom portion 70*a* as seen in plan view is larger than the size of touch panel 1 and holding part 60, and touch panel 1 and holding part 60 are disposed inside the region surrounded by first side surfaces 70*b* and second side surfaces 70*c*. That is, touch panel 1 and holding part 60, including electromagnetic actuator 10, are accommodated inside accommodating base part 70.

As illustrated in FIGS. 2 and 3, lower recessed portion 71 recessed toward the back surface side is formed in the front surface side of bottom portion 70*a*. Since lower recessed portion 71 serves as a space for accommodating core assembly 20 protruding from fixed body 30 of electromagnetic actuator 10 toward the back surface side, lower recessed portion 71 is disposed at a position facing core assembly 20 and has a rectangular shape larger than the size of core assembly 20 as seen in plan view. When core assembly 20 is accommodated in lower recessed portion 71 formed in this manner, it is possible to reduce the length (reduce the thickness) of haptic feeling presenting device 100A in the Z-direction, to achieve height reduction and thickness reduction.

Further, insertion holes 72*a* recessed in the back surface side and through holes 72*b* penetrating in the Z-direction in insertion holes 72*a* are formed in the front surface side of bottom portion 70*a*. Here, insertion holes 72*a* are formed in recessed portions of the circular opening in accordance with the shape (cylindrical shape) of support columns 11 to be inserted. Support columns 11 are inserted into insertion holes 72*a*, screws 12 are put in through holes 72*b*, and screws 12 are screwed into support columns 11, whereby fixed body 30 of electromagnetic actuator 10 is fixed to and supported by accommodating base part 70.

Further, protruding portions 73 protruding toward the front surface side are formed on the front surface side of bottom portion 70*a*. Protruding portions 73 are respectively disposed at four corners of rectangular bottom portion 70*a*. Dampers 81 are disposed between back surface 60*a* of holding part 60 and front surfaces 73*a* of protruding portions 73.

<Damper>

Dampers 81 are a member that damps vibration of holding part 60 applied by electromagnetic actuator 10.

Dampers 81 have a rectangular parallelepiped shape, and are disposed in contact, at opposite end portions in the vibration direction (Z-direction) in which holding part 60 vibrates, with back surface 60*a* of holding part 60 and front surfaces 73*a* of protruding portions 73 of accommodating base part 70, respectively. The opposite end portions of dampers 81 in the Z-direction are in contact with back surface 60*a* and front surfaces 73*a*, respectively, at all times including when holding part 60 is vibrating (moving in the Z-direction) due to electromagnetic actuator 10 or disturbance.

In order to achieve such a contact state, dampers 81 are disposed to be sandwiched between back surface 60*a* and front surfaces 73*a* while compressed in a direction along the Z-direction. In this case, the thickness of non-compressed dampers 81 in the Z-direction is set to be larger than the gap between back surface 60*a* and front surfaces 73*a*. Then, when dampers 81 are sandwiched between back surface 60*a* and front surfaces 73*a*, dampers 81 are disposed between back surface 60*a* and front surfaces 73*a* while compressed.

As such dampers 81, an elastic body such as rubber can be used. As dampers 81, in particular, it is preferable to use a silicone rubber or a butyl rubber with little change in damping property due to a temperature change.

Above-described dampers 81 can settle (damp) vibration of touch panel 1, holding part 60, and movable body 40 in a certain period of time, and it is thus possible to apply a clear haptic feeling to the operator.

If there is a gap between dampers 81 and at least one of back surface 60*a* and front surfaces 73*a*, the vibration is in some cases not be damped depending on the amplitude of vibration of holding part 60 or the like. Unlike this, in the present embodiment, the opposite end portions of damper 81 in the Z-direction are always in contact with back surface 60*a* and front surfaces 73*a*, respectively. Therefore, in any case, the damping of the vibration can be stably performed, and the vibration can be dampened in a predetermined time, whereby a clear haptic feeling can be stably applied to the operator.

As will be described later, elastic parts 50 of electromagnetic actuator 10 are composed of leaf springs, and the leaf springs also have a certain damping effect. However, only with the leaf springs which have elasticity and also high rigidity, stronger persistence of the vibration affecting the haptic feeling is caused. Therefore, the present embodiment also uses dampers 81 made of a relatively soft material in combination, to make it possible to apply a clear haptic feeling to the operator, thereby improving the haptic feeling.

Dampers 81 also function as an impact suppresser that suppresses an impact on elastic parts 50 of electromagnetic actuator 10, which will be described later, when an unnecessary impact is applied from the outside to haptic feeling presenting device 100A, for example.

For example, when an unnecessary impact is applied to haptic feeling presenting device 100A from the outside, and if dampers 81 are not disposed, holding part 60 may be largely moved in the Z-direction due to this impact, and elastic parts 50 may be plastically deformed and damaged. Unlike this, the present embodiment limits the movement range of holding part 60 in the Z-direction using above-described dampers 81, and it is thus possible to suppress the impact on elastic parts 50 and prevent elastic parts 50 from being plastically deformed or damaged.

Further, in the present embodiment, dampers 81 are disposed to be sandwiched between back surface 60*a* and front surfaces 73*a* while compressed in a direction along the Z-direction as described above. Therefore, a relatively large static frictional force acts between dampers 81 and back surface 60*a* and between dampers 81 and back surface 60*a*. Since the movement range of holding part 60 in the X-direction and the Y-direction can be limited by such a static friction force, it is possible to suppress the impact on elastic parts 50 and prevent elastic parts 50 from being plastically deformed or damaged. Further, it is also possible to prevent touch panel 1 and holding part 60 from coming into contact with accommodating base part 70, and to prevent deformation and damage in touch panel 1, holding part 60, and accommodating base part 70.

In addition, since dampers 81 are disposed on back surface 60*a* of holding part 60 and do not interfere with the operation surface of touch panel 1, the operation surface of touch panel 1 can be used up to its outer peripheral portion.

In the present embodiment, haptic feeling presenting device 100A includes damper 81 at each of the four corners between holding part 60 and accommodating base part 70, but the number of dampers 81 may be three or more. In any case, dampers 81 are disposed to surround the center of gravity of touch panel 1, holding part 60, and movable body 40 (drive target object). Dampers 81 may also be disposed at uniform intervals. When the number and the position of dampers 81 are changed, the number and the position of protruding portions 73 are also changed in accordance with the number and the position of dampers 81.

When arrangement of dampers 81 with respect to holding part 60 is bad, touch panel 1, holding part 60, and movable body 40 move obliquely with respect to the Z-direction, causing flapping during vibration, which causes noise. In addition, imbalance may be caused between the load that presses touch panel 1 at the time of operation and the displacement of touch panel 1, holding part 60, and movable body 40, and may lead to variations in the haptic feeling applied by electromagnetic actuator 10.

Unlike this, in the present embodiment, damper 81 is disposed at each of the four corners between holding part 60 and accommodating base part 70 as described above. Therefore, it is possible to suppress the movement of touch panel 1, holding part 60, and movable body 40 obliquely with respect to the Z-direction, and to suppress the occurrence of flapping and noise at the time of vibration. In addition, the displacement of touch panel 1, holding part 60, and movable body 40 can be well balanced with respect to the load that presses touch panel 1 at the time of operation, and a load in the bending direction caused by the load can be suppressed.

<Vibration Actuator>

In the present embodiment, the vibration actuator is, for example, electromagnetic actuator 10. Electromagnetic actuator 10 provides various types of haptic feelings corresponding to images on the operation surface on which the operator performs a touch operation.

For example, electromagnetic actuator 10 applies a haptic feeling for a push button or a switch corresponding to an image of a push button, a switch, or the like to be subjected to a touch operation. Switches include mechanical switches such as tactile switches, alternate switches, momentary switches, toggle switches, slide switches, rotary switches, DIP switches, and rocker switches. Further, for push-type switches, it is possible to apply haptic feelings of switches different in degree of how much the switch is pushed in.

Electromagnetic actuator 10 that applies such a haptic feeling will be described with reference to FIGS. 5 to 8.

Figure 5:
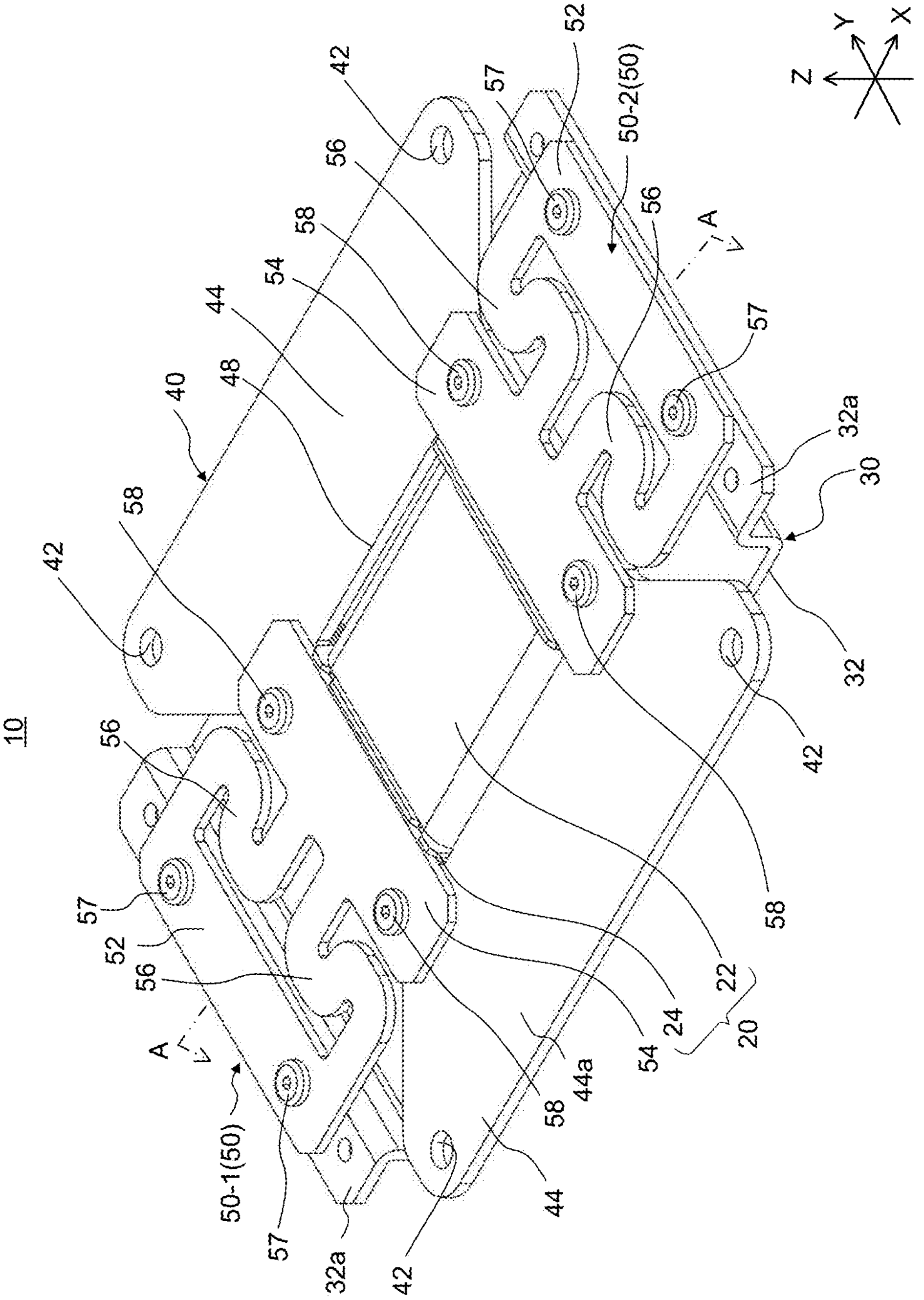
FIG. 5 is an enlarged view of the vibration actuator illustrated in FIG. 2.
Figure 6:
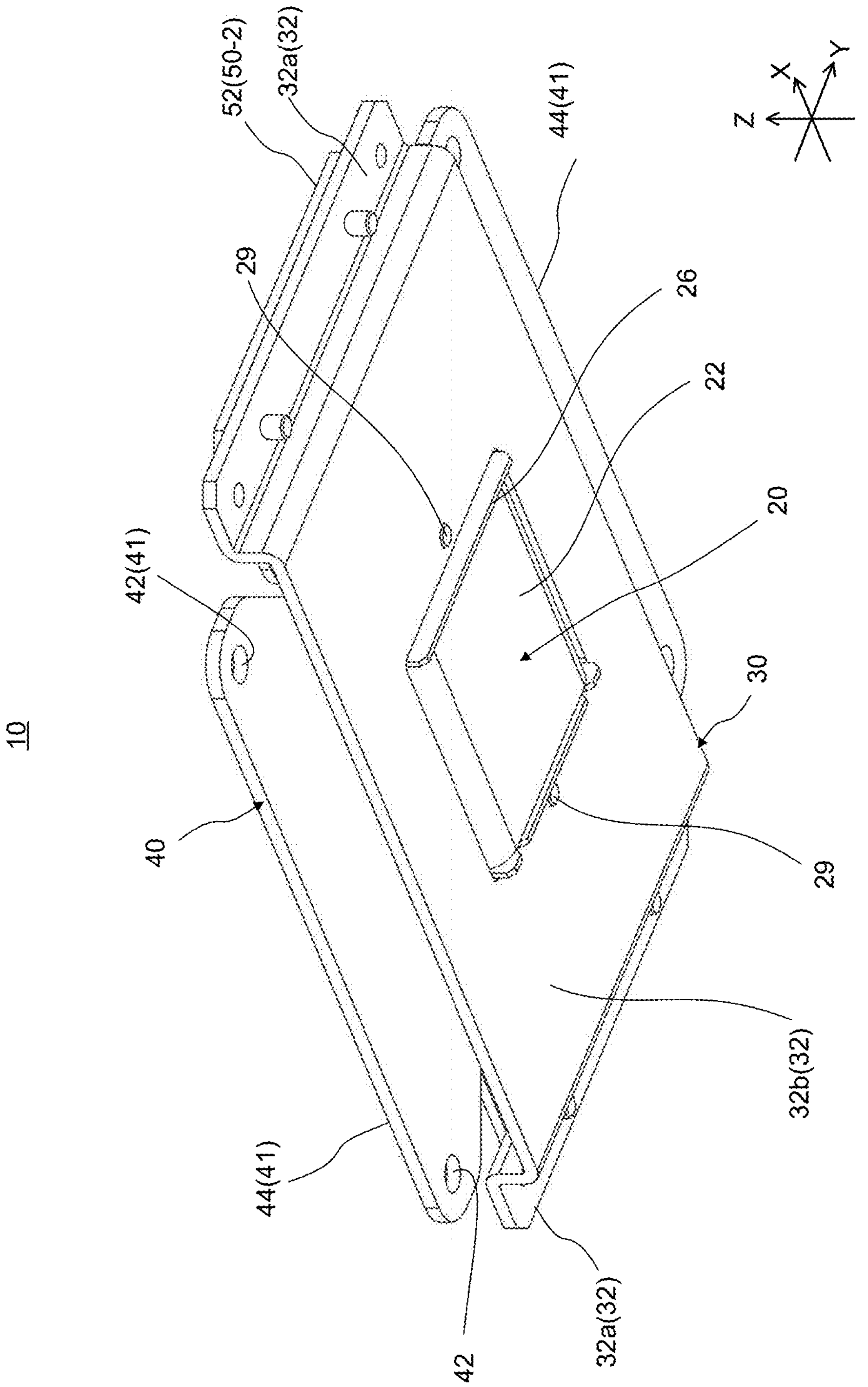
FIG. 6 is a perspective view of the vibration actuator illustrated in FIG. 5 as seen from a lower side.
Figure 7:
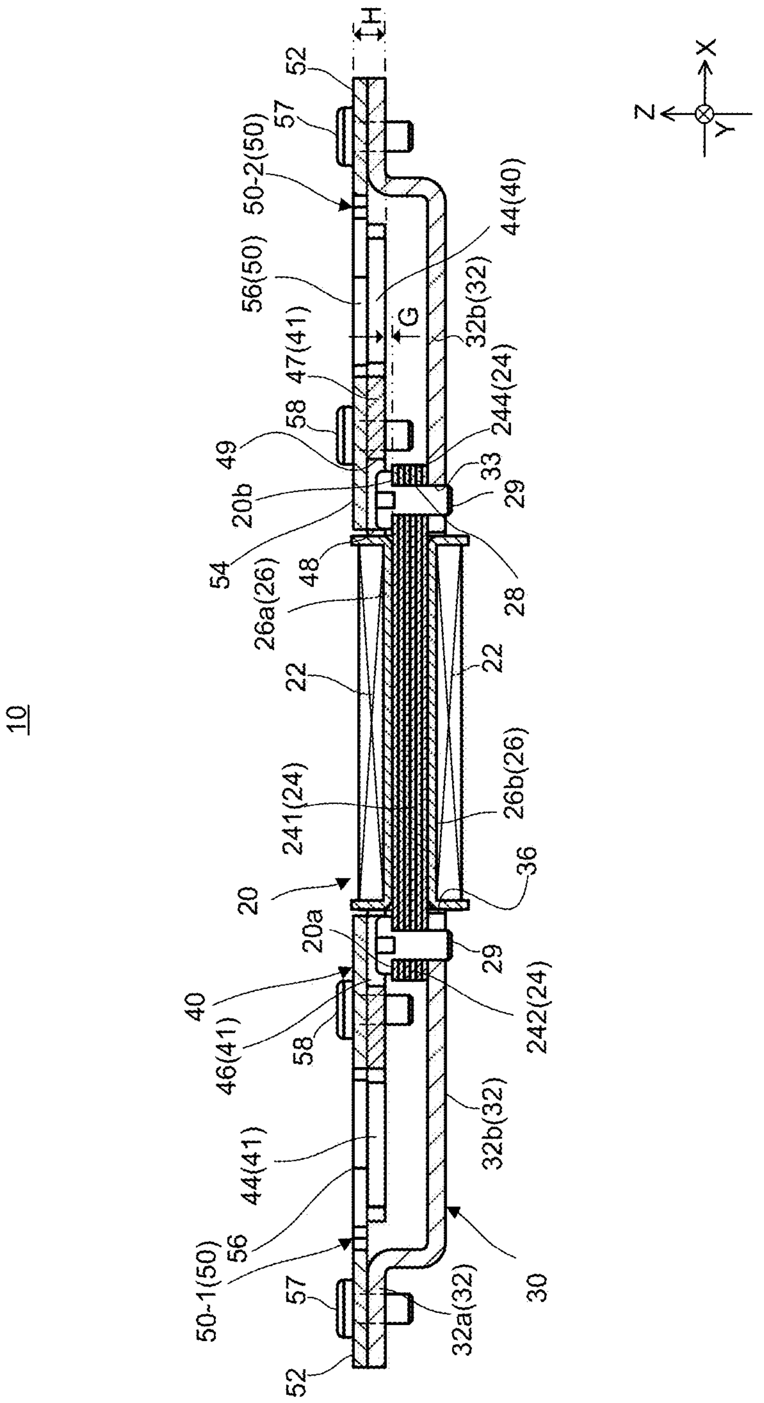
FIG. 7 is a sectional view of the vibration actuator illustrated in FIG. 5 as taken along line A-A.
Figure 8:
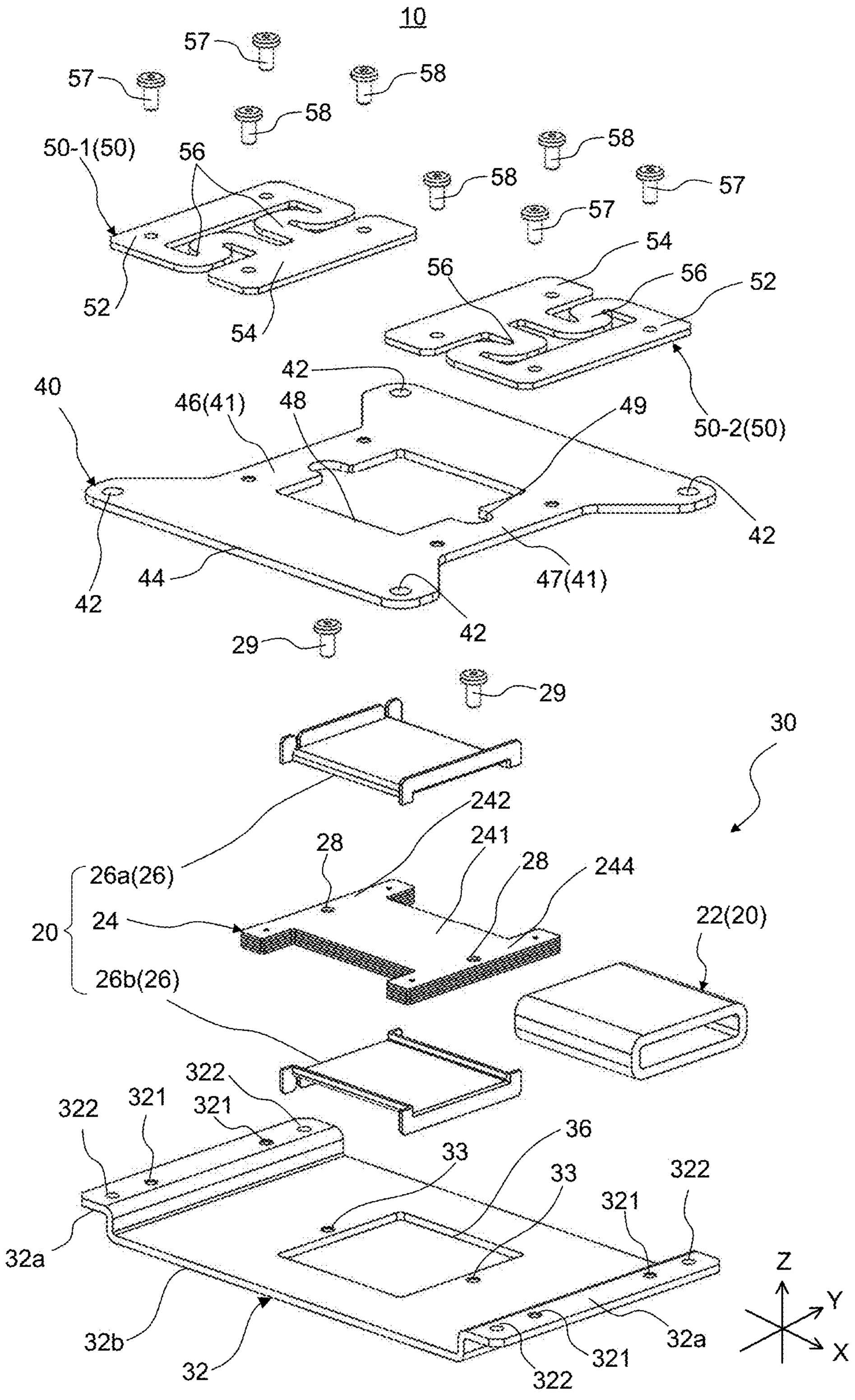
FIG. 8 is an exploded perspective view of the vibration actuator illustrated in FIG. 5.

FIG. 5 is a perspective view of electromagnetic actuator 10 included in haptic feeling presenting device 100A as viewed from the obliquely upper side. FIG. 6 is a perspective view of electromagnetic actuator 10 viewed from the obliquely lower side. FIG. 7 is a sectional view taken along line A-A of electromagnetic actuator 10 illustrated in FIG. 5. FIG. 8 is an exploded perspective view of electromagnetic actuator 10.

Electromagnetic actuator 10 functions as a vibration generating source of touch panel 1 and holding part 60 (see FIGS. 1 to 3), and applies a haptic feeling corresponding to a touch operation to an operator of touch panel 1.

Electromagnetic actuator 10 includes fixed body 30 fixed to accommodating base part 70, and movable body 40 that supports touch panel 1 and holding part 60. Movable body 40 is supported by fixed body 30 via elastic parts 50 so as to be elastically vibratable in the vibration direction. As described above, electromagnetic actuator 10 is disposed to connect touch panel 1, holding part 60, and accommodating base part 70 to one another.

Electromagnetic actuator 10 linearly reciprocates movable body 40 by driving movable body 40 in one direction and moving movable body 40 in the direction opposite to the one direction by a biasing force of elastic parts 50 that generates the biasing force.

Here, driving in one direction means driving movable body 40 in one direction in the vibration direction by exciting coil 22, which will be described later, in movable body 40 supported to be movable in the vibration direction with respect to fixed body 30 via elastic parts 50. In this way, when movable body 40 is driven in one direction in the vibration direction, movable body 40 is then moved in the direction opposite to the one direction by the biasing force of elastic parts 50 after the driving. By repeatedly performing such driving, movable body 40 is vibrated. The vibration of movable body 40 generated in this manner is generated with extremely high responsiveness for generation of vibration after a drive signal is input to coil 22, and it is thus possible to immediately apply, via touch panel 1, a haptic feeling to the operator who performs a touch operation on touch panel 1.

As will be described in detail later, fixed body 30 includes core assembly 20 in which coil 22 is wound around core 24, and base part 32. Movable body 40 includes yoke 41 which is a magnetic body. Elastic parts 50 (50-1, 50-2) elastically support movable body 40 such that the movable body is movable in the vibration direction with respect to fixed body 30.

Then, electromagnetic actuator 10 drives fixed body 30 so as to move, in one direction, movable body 40 movably supported by elastic parts 50. Further, the movement of movable body 40 in the direction opposite to the one direction takes place by the biasing force of elastic parts 50.

Specifically, electromagnetic actuator 10 vibrates yoke 41 of movable body 40 by core assembly 20. More specifically, movable body 40 is vibrated by the attraction force of energized coil 22 and core 24 excited by energized coil 22 and the biasing force of elastic parts 50 (50-1, 50-2). In the present embodiment, electromagnetic actuator 10 is driven by the action of an electromagnet.

Further, electromagnetic actuator 10 is formed in a flat shape with the Z-direction as the thickness direction. Electromagnetic actuator 10 vibrates movable body 40 with respect to fixed body 30 in the Z-direction, that is, the thickness direction as the vibration direction. As described above, in electromagnetic actuator 10, one of the front and back members (fixed body 30 and movable body 40) disposed apart from each other in the thickness direction of electromagnetic actuator 10 itself is moved closer to and away from the other in the Z-direction.

In the present embodiment, electromagnetic actuator 10 moves movable body 40 toward the negative side in the Z-direction as one direction by the attraction force of core 24, and moves movable body 40 toward the positive side in the Z-direction by the biasing force of elastic parts 50 (50-1, 50-2).

In electromagnetic actuator 10 of the present embodiment, movable body 40 is elastically supported by a plurality of elastic parts 50 (50-1, 50-2) arranged along a direction orthogonal to the Z-direction at positions point-symmetrical with respect to the movement center of movable body 40.

<Fixed Body>

As illustrated in FIGS. 7 and 8, fixed body 30 includes core assembly 20 having coil 22 and core 24, and base part 32.

Core assembly 20 is fixed to base part 32 and base part 32 supports movable body 40 such that the movable body can vibrate via elastic parts 50 (50-1 and 50-2). Base part 32 is a flat member and forms a bottom surface of electromagnetic actuator 10. Base part 32 has attachment portions 32*a* to which one end portions of elastic parts 50 (50-1, 50-2) are fixed, such that the one end portions sandwich core assembly 20. Attachment portions 32*a* are disposed at the same distances from core assembly 20. Note that the distances serve as deformation regions of elastic parts 50 (50-1, 50-2).

As illustrated in FIG. 8, each of attachment portions 32*a* includes fixing holes 321 for fixation of elastic part 50 (50-1, 50-2), and fixing holes 322 for fixation of base part 32 to bottom portion 70*a* (see FIG. 2 and the like) of accommodating base part 70. Fixing holes 322 are formed in the opposite end portions of attachment portion 32*a* so as to sandwich fixing holes 321, and are fixed to bottom portion 70*a* via cylindrical support columns 11 as illustrated in FIGS. 2 and 3. As a result, base part 32 is entirely stably fixed to bottom portion 70*a* (see FIGS. 2 and 3).

In the present embodiment, base part 32 is formed by processing a sheet metal such that one side portion and the other side portion, which are attachment portions 32*a*, sandwich bottom surface portion 32*b* and are spaced apart from each other in the width direction (X-direction). Between attachment portions 32*a*, a depressed portion having bottom surface portion 32*b* lower in height than attachment portions 32*a* is formed. The space in the depressed portion, that is, the space on the front surface of bottom surface portion 32*b*, is a space for securing the elastic deformation region of elastic parts 50 (50-1, 50-2), and is a space for securing the movement region of movable body 40 supported by elastic parts 50 (50-1, 50-2).

Bottom surface portion 32*b* is rectangular in shape, and opening portion 36 is formed in a central portion thereof, and core assembly 20 is positioned in opening portion 36.

Core assembly 20 is fixed in a state of being partially inserted into opening portion 36. Specifically, divided body 26*b* of bobbin 26 on the lower side of core assembly 20 and a lower portion of coil 22 are inserted into opening portion 36, and are fixed such that core 24 is positioned on bottom surface portion 32*b* when viewed from the side.

As a result, the length in the Z-direction is shorter (thinner) than the configuration in which core assembly 20 is attached to bottom surface portion 32*b*. In addition, since a part of core assembly 20, in this case, a part of the core assembly on the bottom surface side is fixed in a state of being fitted into opening portion 36, core assembly 20 is firmly fixed in a state of being unlikely to be detached from bottom surface portion 32*b*.

Opening portion 36 has a shape corresponding to the shape of core assembly 20. In the present embodiment, opening portion 36 is formed in a rectangular shape. As a result, core assembly 20 and movable body 40 can be arranged in the center portion of electromagnetic actuator 10, and entire electromagnetic actuator 10 can be formed into a substantially rectangular shape in plan view.

Core assembly 20, in cooperation with elastic parts 50 (50-1, 50-2), vibrates yoke 41 of movable body 40, that is, causes the yoke to reciprocate linearly in the Z-direction. The vibration direction is a direction perpendicular to the surface of touch panel 1.

In the present embodiment, core assembly 20 is formed in a rectangular plate shape, and magnetic pole portions 242 and 244 are disposed on the opposite side portions spaced apart in the longitudinal direction (X-direction) of the rectangular plate shape.

Magnetic pole portions 242 and 244 are disposed close to the lower surfaces of attracted surface portions 46 and 47 of movable body 40 so as to face the lower surfaces with gap G (see FIG. 7) in the Z-direction. At magnetic pole portions 242 and 244, opposing surfaces (opposing surface portions) 20*a* and 20*b*, which are upper surfaces, face the lower surfaces of attracted surface portions 46 and 47 of yoke 41 in the vibration direction of movable body 40.

Core assembly 20 is formed by winding coil 22 on the outer periphery of core 24 via bobbin 26. As illustrated in FIGS. 7 and 8, core assembly 20 is fixed to base part 32 such that the winding axis of coil 22 is aligned in the direction in which attachment portions 32*a* are spaced apart from each other in base part 32. In the present embodiment, core assembly 20 is disposed at a central portion of base part 32, specifically, at a central portion of bottom surface portion 32*b*.

As illustrated in FIG. 7, core assembly 20 is fixed to bottom surface portion 32*b* in parallel to bottom surface portion 32*b* such that core 24 is positioned on the bottom surface across opening portion 36. Core assembly 20 is fixed by screws 29, which are a fastening member, in a state in which coil 22 and a part (core main body 241) on which coil 22 is wound are positioned in opening portion 36 of base part 32 (see FIGS. 6 to 8).

Specifically, core assembly 20 is fixed to bottom surface portion 32*b* by fastening screws 29 through fixing holes 28 and fastening holes 33 in bottom surface portion 32*b* while coil 22 is disposed in opening portion 36 (see FIG. 8). Core assembly 20 and bottom surface portion 32*b* are joined to each other by screws 29 at two locations on the axis of coil 22 such that the opposite side portions of opening portion 36 spaced apart from each other in the X-direction and magnetic pole portions 242 and 244 sandwich coil 22.

Coil 22 is a solenoid that is energized to generate a magnetic field when electromagnetic actuator 10 is driven. Coil 22, together with core 24 and movable body 40, constitutes a magnetic circuit (magnetic path) for attracting and moving movable body 40. When a drive signal is supplied to coil 22 from drive control section 110 (see FIG. 11), which will be described later, power is supplied to coil 22, and electromagnetic actuator 10 is driven.

Core 24 includes core main body 241 around which coil 22 is wound, and magnetic pole portions 242 and 244 disposed on the opposite end portions of core main body 241 and excited by energizing coil 22.

Core 24 may have any structure as long as it has a length allowing the opposite end portions to serve as magnetic pole portions 242 and 244 by energization of coil 22. For example, core 24 as seen in plan view may be formed in a flat plate shape of a straight type (I type), but is formed in a flat plate shape of an H type in the present embodiment. The H-type core has a shape in which gap side surfaces at the opposite end portions of core main body 241 are longer than the width of the core main body around which coil 22 is wound and are enlarged in the front-rear direction (Y-direction) as compared with an I-type core.

Therefore, according to the H-type core, it is possible to make the magnetoresistance lower than in the case of the I-type, to improve the efficiency of the magnetic circuit. Further, only by fitting bobbin 26 between portions of magnetic pole portions 242 and 244 protruding from core main body 241, coil 22 can be positioned, and it is not necessary to separately provide a positioning member for positioning bobbin 26 with respect to core 24.

In core 24, magnetic pole portions 242 and 244 are disposed on the opposite end portions of plate-shaped core main body 241 around which coil 22 is wound, so as to protrude in a direction orthogonal to the winding axis of coil 22.

Core 24 is a magnetic material, and is formed of, for example, a silicon steel sheet, permalloy, ferrite, or the like. Core 24 may be made of an electromagnetic stainless steel, a sintered material, a metal injection mold (MIM) material, a laminated steel sheet, an electrolytic zinc-coated steel sheet (SECC), or the like.

Magnetic pole portions 242 and 244 protrude from the insides of opposite opening portions of coil 22 toward the positive side and the negative side in the X-direction, respectively, and further extend toward the positive side and the negative side in the Y-direction, respectively.

Magnetic pole portions 242 and 244 are excited by energization of coil 22 to attract and move yoke 41 of movable body 40 that is separated from the magnetic pole portions in the vibration direction (Z-direction). Specifically, magnetic pole portions 242 and 244 attract, by generated magnetic fluxes, attracted surface portions 46 and 47 of movable body 40 disposed to face the magnetic pole portions via gap G.

Magnetic pole portions 242 and 244 are plate-shaped bodies extending in the Y-direction, which is a direction perpendicular to core main body 241 extending in the X-direction. Since magnetic pole portions 242 and 244 are long in the Y-direction, the area of opposing surfaces 20*a* and 20*b* facing yoke 41 is larger than that of a configuration in which the magnetic pole portions are formed on the opposite end portions of core main body 241.

Fixing holes 28 are formed in the center portions of magnetic pole portions 242 and 244 in the Y-direction, and are fixed to base part 32 by screws 29 inserted into fixing holes 28.

Bobbin 26 is disposed so as to enclose core main body 241 of core 24. Bobbin 26 is made of, for example, a resin material. As a result, it is possible to ensure electrical insulation from another metallic member (for example, core 24), and thus the reliability of the electrical circuit is improved. By using a highly flowable resin as the resin material, the moldability is enhanced, and the wall thickness can be reduced while securing the strength of bobbin 26.

Bobbin 26 is formed as a cylindrical body covering the periphery of core main body 241 by assembling divided bodies 26*a* and 26*b* such that the divided bodies sandwich core main body 241. Bobbin 26 is provided with flanges at the opposite end portions of the cylindrical body, and restricts coil 22 such that the coil is positioned on the outer periphery of core main body 241.

<Movable Body>

Movable body 40 is disposed to face core assembly 20 with a predetermined gap therebetween in a direction orthogonal to the vibration direction (Z-direction). Movable body 40 is disposed to be capable of reciprocating in the vibration direction with respect to core assembly 20.

Movable body 40 includes yoke 41 and includes movable-body-side fixing portions 54 of elastic parts 50-1 and 50-2 fixed to yoke 41.

Movable body 40 is disposed in a state (reference state position) of being suspended via elastic parts 50 (50-1, 50-2) while extending in parallel with and separately from bottom surface portion 32*b* such that the movable body is movable in a direction (Z-direction) toward or away from bottom surface portion 32*b*.

Yoke 41 is a plate-shaped member made of a magnetic material such as an electromagnetic stainless steel, a sintered material, a metal injection mold (MIM) material, a laminated steel sheet, or an electrolytic zinc-coated steel sheet (SECC). In the present embodiment, yoke 41 is formed by processing an SECC plate.

Yoke 41 is suspended with respect to core assembly 20 by elastic parts 50 (50-1, 50-2) fixed to attracted surface portions 46 and 47 separated from each other in the X-direction, so as to face the core assembly with gap G (see FIG. 7) therebetween in the vibration direction (Z-direction).

Yoke 41 includes surface-portion fixing portion 44 to which holding part 60 is attached, and attracted surface portions 46 and 47 disposed to face magnetic pole portions 242 and 244.

In the present embodiment, yoke 41 is formed in a rectangular frame shape that surrounds opening portion 48 of the central portion by surface-portion fixing portion 44 and attracted surface portions 46 and 47.

Opening portion 48 faces coil 22. In the present embodiment, opening portion 48 is located directly above coil 22, and the opening shape of opening portion 48 is formed such that a portion of core assembly 20 corresponding to coil 22 can be inserted in the opening portion when yoke 41 moves toward bottom surface portion 32*b*. Since yoke 41 has opening portion 48, the entire thickness of electromagnetic actuator 10 can be reduced as compared with the case where opening portion 48 is not formed.

Further, since core assembly 20 is positioned in opening portion 48, yoke 41 is not disposed at a distance to coil 22 shorter than the distance (gap G) between magnetic pole portions 242 and 244 of core main body 241 and attracted surface portions 46 and 47 of yoke 41. Therefore, it is possible to suppress a decrease in conversion efficiency due to any leakage magnetic flux leaking from coil 22, and it is thus possible to achieve a high output.

Surface-portion fixing portion 44 has fixing surface 44*a* for fixation of holding part 60. Fixing surface 44*a* fixes holding part 60 at a position surrounding core assembly 20 via screws 62 which are fastening members inserted into surface-portion fixing holes 42 (see also FIG. 4).

Attracted surface portions 46 and 47 are attracted to magnetic pole portions 242 and 244 magnetized in core assembly 20, and elastic parts 50 (50-1 and 50-2) are fixed to attracted surface portions 46 and 47.

Movable-body-side fixing portions 54 of elastic parts 50-1 and 50-2 are fixed to attracted surface portions 46 and 47, respectively, in a stacked state. Each of attracted surface portions 46 and 47 is provided with cutout portion 49 that allows the head portion of screw 29 of core assembly 20 to pass therethrough during movement toward the bottom surface portion 32*b* side.

Thus, even when movable body 40 moves toward the bottom surface portion 32*b* side and attracted surface portions 46 and 47 approach magnetic pole portions 242 and 244, attracted surface portions 46 and 47 do not make contact with screws 29 for fixing magnetic pole portions 242 and 244 to bottom surface portion 32*b*, and it is thus possible to secure the movement region of yoke 41 in the Z-direction accordingly.

<Elastic Part>

Elastic parts 50 (50-1, 50-2) are elastic supporting parts in the present invention, and supports movable body 40 movably with respect to fixed body 30. Elastic parts 50 (50-1, 50-2) are elastically deformable and are formed in a plate shape. Elastic parts 50 (50-1, 50-2) do not need to be plate-shaped and may also be elastic bodies made in any shape or of any material as long as they support movable body 40 that is driven in one direction of the vibration direction with respect to fixed body 30.

Elastic parts 50 (50-1, 50-2) support the upper surface of movable body 40 at the same height as the upper surface of fixed body 30 or on the lower surface side of the upper surface of fixed body 30 (on the lower surface side of the upper surface of core assembly 20 in the present embodiment) in parallel with each other. Elastic parts 50-1 and 50-2 have symmetrical shapes with respect to the center of movable body 40, and are similarly formed members in the present embodiment.

Elastic parts 50 are disposed to extend substantially parallel to yoke 41 such that the yoke faces magnetic pole portions 242 and 244 of core 24 of fixed body 30 with gap G therebetween. Elastic parts 50 support the lower surface of movable body 40 at a position on the bottom surface portion 32*b* side of a level substantially equal to the height level of the upper surface of core assembly 20 such that the movable body is movable in the vibration direction.

Each of elastic parts 50 is, for example, a leaf spring having fixed-body-side fixing portion 52, movable-body-side fixing portion 54, and serpentine-shaped elastic arm portions 56 that connects fixed-body-side fixing portion 52 and movable-body-side fixing portion 54.

Elastic parts 50 perform attachment of movable body 40 by attaching fixed-body-side fixing portions 52 to the surfaces of attachment portions 32*a*, attaching movable-body-side fixing portions 54 to the surfaces of attracted surface portions 46 and 47 of yoke 41, and causing serpentine-shaped elastic arm portions 56 to extend parallel to bottom surface portions 32*b*.

Fixed-body-side fixing portions 52 are fixed by screws 57 in surface contact with attachment portions 32*a*, and movable-body-side fixing portions 54 are fixed by screws 58 in surface contact with attracted surface portions 46 and 47.

Serpentine-shaped elastic arm portions 56 are arm portions having a serpentine shape. Each of serpentine-shaped elastic arm portions 56 has a serpentine shape portion, thereby securing a length that can be deformed between fixed-body-side fixing portion 52 and movable-body-side fixing portion 54 and in a plane (a plane formed in the X-direction and the Y-direction) orthogonal to the vibration direction, which is necessary for the vibration of movable body 40.

Regarding the leaf springs used as elastic parts 50, if the displacement amount allowed for displacement during vibration of movable body 40 is small, it may happen that a haptic feeling is small and a reliability due to plastic deformation decreases. In contrast, in the present embodiment, elastic parts 50 include serpentine-shaped elastic arm portions 56 described above, deformation during vibration can be distributed by the meandering shape portions, and a highly reliable spring can be obtained. In addition, a spring capable of coping with increased amplitude during vibration can also be obtained.

In the present embodiment, each of serpentine-shaped elastic arm portions 56 extends and is folded back in a direction in which fixed-body-side fixing portion 52 and movable-body-side fixing portion 54 face each other, and its end portions joined respectively to fixed-body-side fixing portion 52 and movable-body-side fixing portion 54 are formed at positions shifted in the Y-direction. Serpentine-shaped elastic arm portions 56 are disposed at point symmetrical or line symmetrical positions with respect to the center of movable body 40.

As a result, movable body 40 is supported on opposite sides by serpentine-shaped elastic arm portions 56 having the serpentine-shaped springs, and stress distribution during elastic deformation is made possible. That is, elastic parts 50 can move movable body 40 in the vibration direction (Z-direction) without causing the movable body to be inclined with respect to core assembly 20, and thus the reliability of the vibration state can be improved.

Each of elastic parts 50 has at least two or more serpentine-shaped elastic arm portions 56. Thus, as compared with the case where the number of serpentine-shaped elastic arm portions 56 is one, the stress at the time of the elastic deformation is more distributed and the reliability can be improved, and the balance of support of movable body 40 can be improved and the stability can be improved.

The leaf springs as elastic parts 50 may be either non-magnetic or magnetic. Further, movable-body-side fixing portions 54 of elastic parts 50 are positioned to face the opposite end portions of core 24 (magnetic pole portions 242 and 244) in the winding axis direction of coil 22, or disposed on the upper side of the opposite end portions. Accordingly, when coil 22 is energized, the movable-body-side fixing portions form a magnetic path together with core 24.

In the case where elastic parts 50 are a magnetic material, movable-body-side fixing portions 54 are laminated on and fixed to the upper side of attracted surface portions 46 and 47. This makes it possible to increase thickness H (see FIG. 7) of attracted surface portions 46 and 47 facing magnetic pole portions 242 and 244 of the core assembly as the thickness of the magnetic material. Since the thickness of elastic parts 50 and the thickness of yoke 41 are the same, the sectional area of a portion of the magnetic material facing magnetic pole portions 242 and 244 can be doubled. Thus, in comparison with the case where the leaf spring is non-magnetic, it is possible to expand the magnetic circuit to reduce a decrease in the characteristics due to magnetic saturation in the magnetic circuit so as to increase the output.

<Magnetic Circuit of Electromagnetic Actuator>

Figure 9:
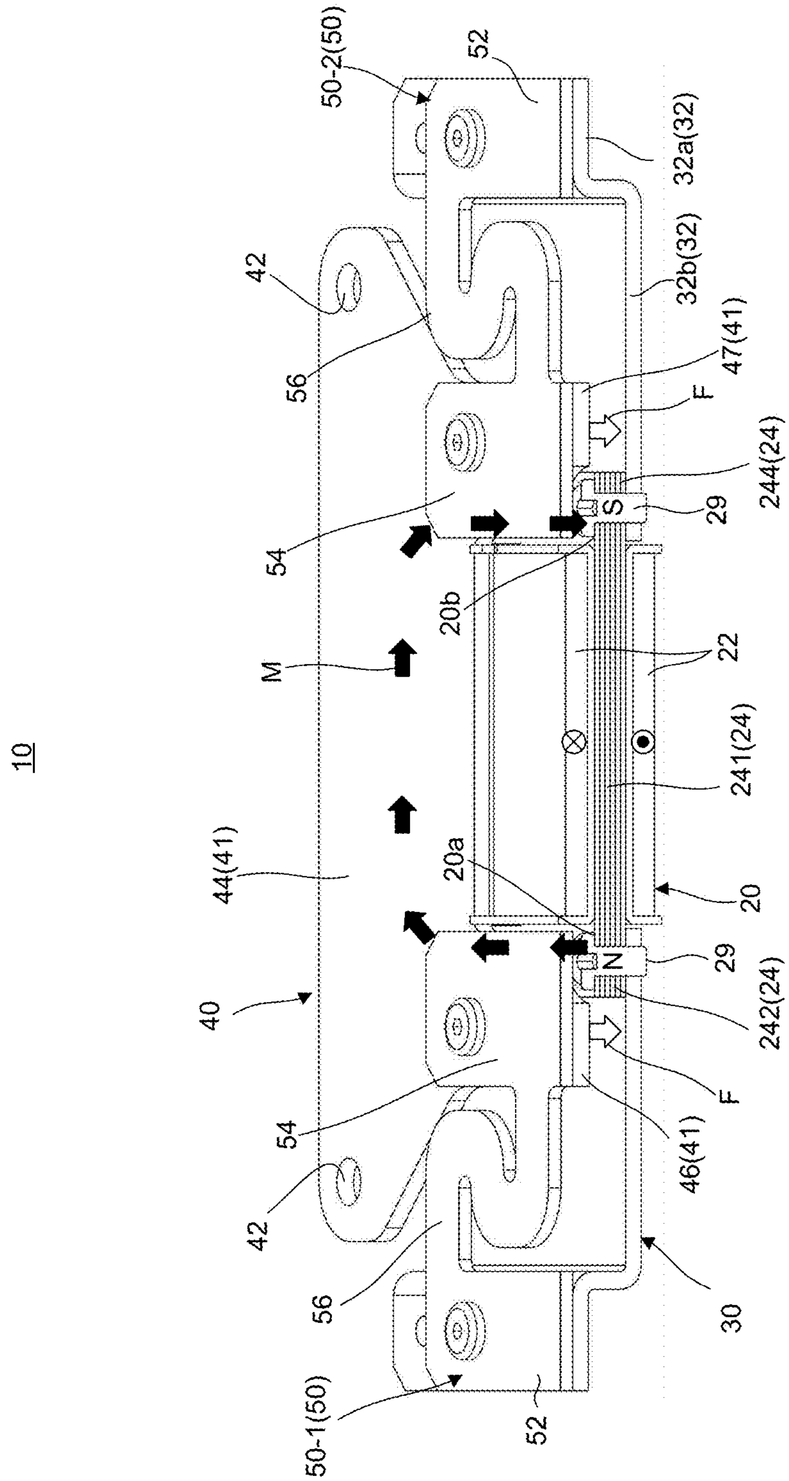
FIG. 9 illustrates a magnetic circuit configuration of the vibration actuator illustrated in FIG. 5.
Figures 10A, 10B:
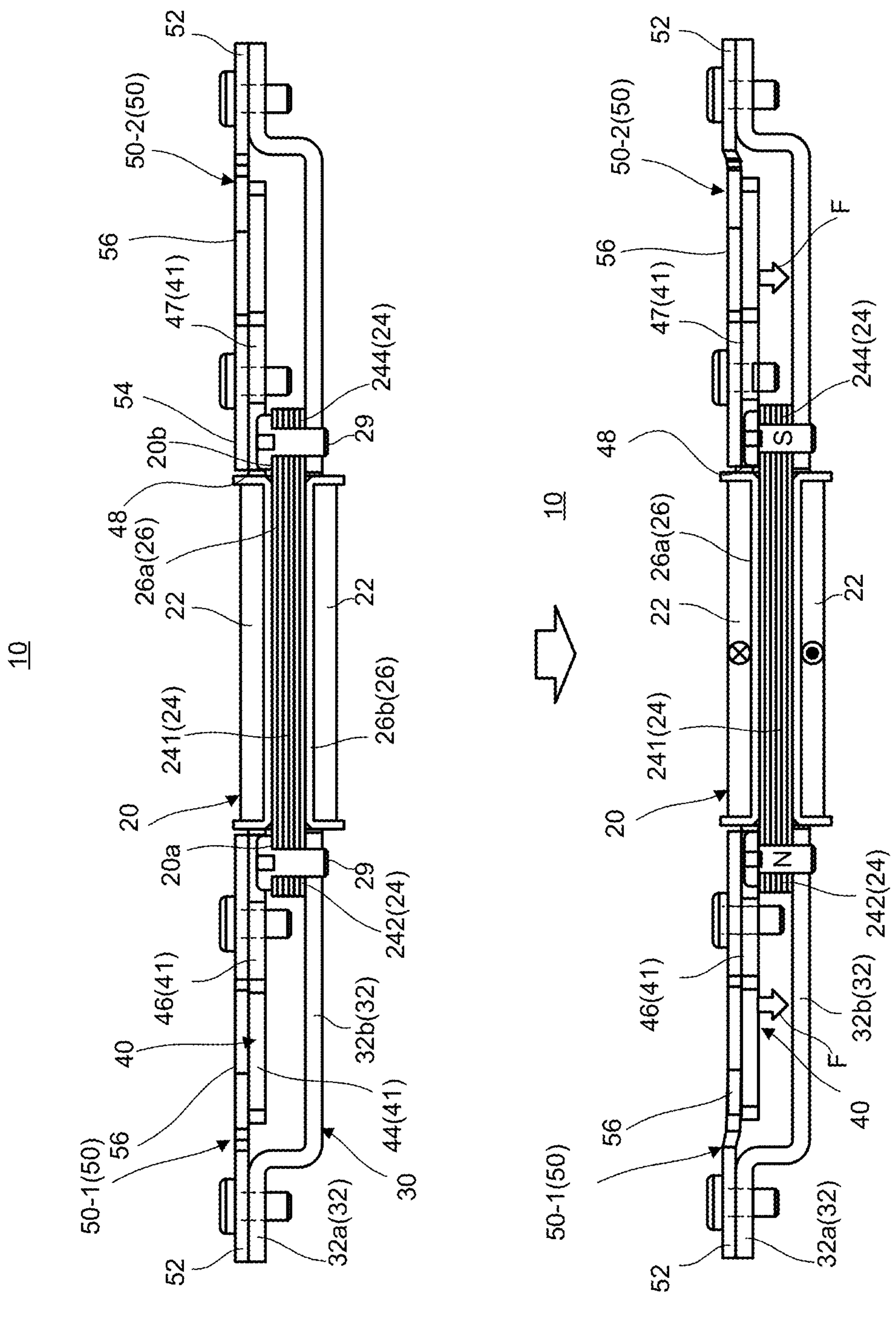
FIGS. 10A and 10B are diagrams for explaining the operation of the vibration actuator illustrated in FIG. 5.

FIG. 9 illustrates the magnetic circuit of electromagnetic actuator 10. Incidentally, FIG. 9 is a perspective view of electromagnetic actuator 10 taken along line A-A of FIG. 5, and a portion of the magnetic circuit which is not illustrated also has flow M of magnetic flux similar to that of an illustrated portion. FIGS. 10A and 10B are diagrams for explaining the operation of electromagnetic actuator 10, and is a sectional view schematically illustrating the movement of movable body 40 by the magnetic circuit. Specifically, FIG. 10A is a view of a state in which movable body 40 is held at a position spaced apart from core assembly 20 by elastic parts 50, and FIG. 10B is a view of a state in which movable body 40 is attracted and moved toward core assembly 20 by a magnetomotive force by the magnetic circuit.

Specifically, when coil 22 is energized, core 24 is excited to generate a magnetic field, and the opposite end portions of core 24 become magnetic poles. For example, as illustrated in FIG. 9, in core 24, magnetic pole portion 242 serves as an N-pole and magnetic pole portion 244 serves as an S-pole. Then, a magnetic circuit represented by flow M of magnetic flux is formed between core assembly 20 and yoke 41. Flow M of the magnetic flux in this magnetic circuit flows from magnetic pole portion 242 to attracted surface portion 46 of yoke 41 that magnetic pole portion 242 faces, and flows through surface-portion fixing portion 44 of yoke 41 and attracted surface portion 47 to magnetic pole portion 244 facing attracted surface portion 47.

In the case where elastic parts 50 are a magnetic material, the magnetic flux (indicated by flow M of the magnetic flux) flowing to attracted surface portion 46 passes through attracted surface portion 46 of yoke 41 and movable-body-side fixing portion 54 of elastic part 50-1 since elastic parts 50 are also the magnetic material. The magnetic flux flows from the opposite ends of attracted surface portion 46 to the opposite ends of attracted surface portion 47 and movable-body-side fixing portion 54 of elastic part 50-2 via surface-portion fixing portion 44.

Thus, according to the principle of the electromagnetic solenoid, magnetic pole portions 242 and 244 of core assembly 20 generate attraction force F to attract attracted surface portions 46 and 47 of yoke 41. Then, attracted surface portions 46 and 47 of yoke 41 are attracted by both of magnetic pole portions 242 and 244 of core assembly 20. In addition, movable body 40 including yoke 41 moves in the F-direction against the biasing force of elastic parts 50 (see FIGS. 10A and 10B).

Further, when the energization of coil 22 is released, the magnetic field disappears, attraction force F of movable body 40 by core assembly 20 disappears, and the movable body moves in the direction (−F direction) toward the original position by the biasing force of elastic parts 50.

By repeating this, electromagnetic actuator 10 causes movable body 40 to reciprocate linearly in the Z-direction to generate vibration in the vibration direction (Z-direction).

By reciprocating movable body 40 linearly, holding part 60 and touch panel 1 fixed to movable body 40 are also displaced in the Z-direction following movable body 40.

In electromagnetic actuator 10, core assembly 20 having core 24 around which coil 22 is wound is fixed to fixed body 30. Core assembly 20 is disposed in opening portion 48 of yoke 41 of movable body 40 which is supported by elastic parts 50 so as to be movable in the Z-direction with respect to fixed body 30.

Thus, in order to drive movable body 40 in the Z-direction by generating magnetism, members disposed in fixed body 30 and movable body 40 need not be disposed to be stacked on each other in the Z-direction (for example, coil 22 and yoke 41 which is a magnetic material need not be disposed such that they face each other in the Z-direction). Therefore, the thickness of electromagnetic actuator 10 in the Z-direction can be reduced. Further, vibration can be applied to holding part 60 and touch panel 1 by linearly reciprocating movable body 40 without using a magnet.

Haptic feeling presenting device 100A is required to faithfully reproduce a haptic feeling when an operator presses an image, for example, of a push button or the like displayed on the operation surface of touch panel 1. In the present embodiment, as described above, haptic feeling presenting device 100A drives electromagnetic actuator 10 to vibrate touch panel 1 in the Z-direction. Therefore, haptic feeling presenting device 100A can apply a haptic feeling in the same direction as the direction of the haptic feeling for the push button or the like, so as to improve the reproducibility of the haptic feeling for the push button or the like.

In addition, the support structure is simple in electromagnetic actuator 10, which can result in a simplified design, space saving, and a reduced thickness of electromagnetic actuator 10. Further, since no magnet is used, the cost can be reduced as compared with a vibration device (so-called actuator) having a configuration using a magnet.

Note that above-described electromagnetic actuator 10 is one exemplary configuration for driving in one direction, and any configuration may be used as electromagnetic actuator 10 as long as it is a configuration for driving in one direction.

In addition, in electromagnetic actuator 10, it is preferable that a plurality of elastic parts 50 be disposed at positions symmetrical with respect to the center of movable body 40, but movable body 40 may be supported by single elastic part 50 to be capable of vibrating with respect to fixed body 30. In this case, single elastic part 50 is configured to support movable body 40 with respect to fixed body 30 in a direction opposed to at least one end portion of the opposite end portions of movable body 40.

In addition, in electromagnetic actuator 10, screws 57 and 58 are used for fixing base part 32 to elastic parts 50 and fixing elastic parts 50 to movable body 40. Accordingly, in order for movable body 40 to be driven, elastic parts 50 that need to be firmly fixed to fixed body 30 and movable body 40 can be mechanically firmly fixed in a state in which rework is enabled.

A rivet may be used instead of screws 57 and 58 used for fixing base part 32 to elastic parts 50 and fixing elastic parts 50 to movable body 40. The rivet includes a body portion without a head portion and a screw portion, and is inserted into members in which a hole is formed, and is plastically deformed by caulking an end portion on the opposite side, thereby joining the members having the hole. For example, the caulking may be performed using a press machine, a dedicated tool, or the like.

<Driving Principle of Electromagnetic Actuator>

The driving principle of electromagnetic actuator 10 will be briefly described below. Electromagnetic actuator 10 is driven by a supplied pulse based on following Equation 1 of motion and circuit Equation 2. In the present embodiment, the driving is performed by inputting a short pulse, but the driving may be performed so as to generate an arbitrary vibration without using the short pulse.

Movable body 40 in electromagnetic actuator 10 performs reciprocating motion based on Equations 1 and 2.

[1]

$$m\frac{d^2x(t)}{dt^2} = K_f i(t) - K_{sp}x(t) - D\frac{dx(t)}{dt} \quad \text{(Equation 1)}$$

m: Mass [kg]
x(t): Displacement [m]
$K_f$: Thrust constant [N/A]
i(t): Current [A]
$K_{sp}$: Spring constant [N/m]
D: Damping coefficient [N/(m/s)]

[2]

$$e(t) = Ri(t) + L\frac{di(t)}{dt} + K_e\frac{dx(t)}{dt} \quad \text{(Equation 2)}$$

e(t): Voltage [V]

R: Resistance [Ω]

L: Inductance [H]

$K_e$: Reverse electromotive force constant [V/(rad/s)]

Mass m [Kg], displacement x(t) [m], thrust constant $K_f$ [N/A], current i(t) [A], spring constant $K_{sp}$ [N/m], damping coefficient D [N/(m/s)], and the like in electromagnetic actuator 10 may be changed appropriately as long as Equation 1 is satisfied. In addition, voltage e(t)[V], resistance R[Ω], inductance L[H], and reverse electromotive force constant $K_e$ [V/(rad/s)] may be changed appropriately as long as Equation 2 is satisfied.

Accordingly, electromagnetic actuator 10 is determined by mass m of movable body 40 and spring constant $K_{sp}$ of the metallic spring (the elastic body, or the leaf spring in the present embodiment) as elastic parts 50.

<Drive Circuit of Electromagnetic Actuator>

Figure 11:
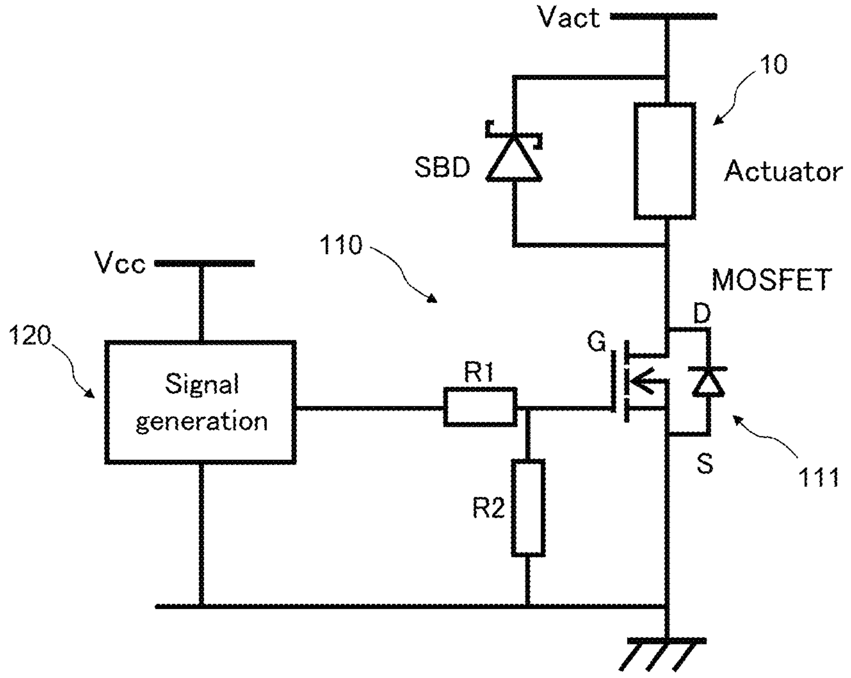
FIG. 11 illustrates an example of a drive circuit of the vibration actuator illustrated in FIG. 5.

FIG. 11 illustrates an example of a drive circuit of electromagnetic actuator 10.

The drive circuit illustrated in FIG. 11 is included in the device control part of haptic feeling presenting device 100A, and includes drive control section 110 that controls driving of electromagnetic actuator 10, and signal generation 120.

Drive control section 110 includes: switching element 111 including metal-oxide-semiconductor field-effect transistor (MOSFET); resistors R1 and R2; and Schottky Barrier Diodes (SBD).

Signal generation 120 connected to power supply voltage Vcc is connected to agate of switching element 111. Switching element 111 is a discharge changeover switch. Switching element 111 is connected to electromagnetic actuator 10 and SBD to which voltage Vact is supplied from a power supply unit.

With the above configuration, signal generation 120 functions as a voltage pulse applier that applies a voltage pulse to switching element 111. Switching element 111 to which the voltage pulse is applied from signal generation 120 functions as a current pulse supply that supplies a current pulse to electromagnetic actuator 10. This current pulse serves as a drive signal for driving electromagnetic actuator 10. Accordingly, switching element 111 can generate a current pulse and supply the current pulse to electromagnetic actuator 10 in accordance with the voltage pulse generated by signal generation 120.

Although not illustrated, haptic feeling presenting device 100A may include a Central Processing Unit (CPU), a Read Only Memory (ROM), a Random Access Memory (RAM), and the like for performing a drive control on electromagnetic actuator 10.

In this instance, the CPU reads a program suited to the processing contents from the ROM, loads the program to the RAM, and drive control section 110 and signal generation 120 drive and control electromagnetic actuator 10 in cooperation with the loaded program. For example, the CPU refers to various types of data such as a signal pattern (for example, a signal pattern for generating a current pulse to be supplied to electromagnetic actuator 10) stored in the ROM or a storage (not illustrated). Note that the storage may include, for example, a non-volatile semiconductor memory (so-called flash memory) or the like.

Drive control section 110 and signal generation 120 generate a voltage pulse and a current pulse based on the signal pattern read from the ROM or the like, and supply the generated current pulse to electromagnetic actuator 10 (coil 22) to drive movable body 40 in one direction in the vibration direction.

By supplying the current pulse to coil 22, movable body 40 is displaced in one direction in the vibration direction against the biasing force of elastic parts 50. During the supply of the current pulse, the displacement of movable body 40 in one direction in the vibration direction is continued.

Then, by stopping the supply of the current pulse, that is, turning off the input of the current pulse to coil 22, the force for displacing movable body 40 in one direction (Z-direction) of the vibration direction is released. Turning off the input of the current pulse means a timing at which the voltage for generating the current pulse is turned off. At a time point in which the voltage is turned off, the current pulse is not completely off, but is in a decaying state.

Movable body 40 moves and is displaced in the other direction (the positive side in the Z-direction) of the vibration direction by the biasing force of elastic parts 50 accumulated at the maximum displaceable position in a retraction direction (the negative side in the Z-direction). A strong vibration is transmitted to the user through movable body 40 that has moved to the positive side in the Z-direction.

In this manner, drive control section 110 supplies one or more current pulses to coil 22 based on the signal pattern, and adjusts the intensity of the vibration and a vibration pattern for haptic feelings to be applied to the operator.

[Variation 1 of Haptic Feeling Presenting Device]

Figure 12:
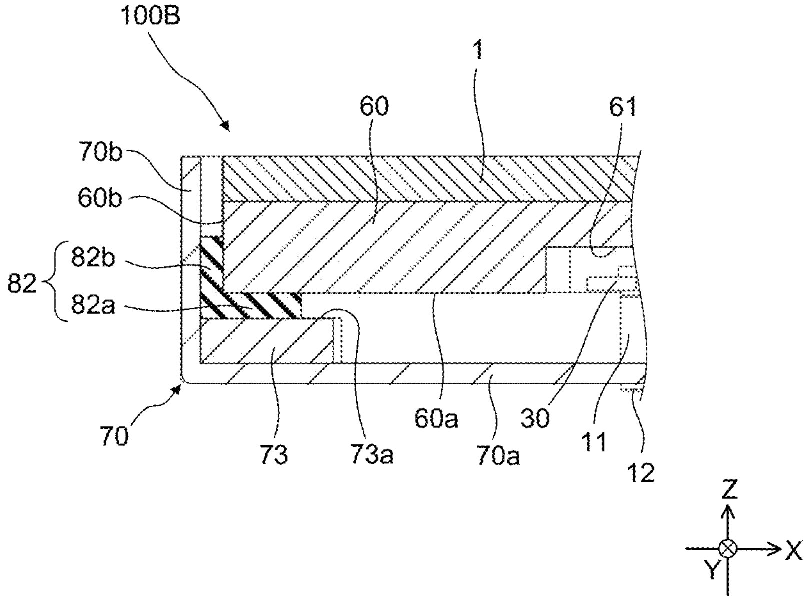
FIG. 12 is a partial sectional view illustrating a variation (Variation 1) of the haptic feeling presenting device according to the embodiment of the present invention.

FIG. 12 is a partial sectional view illustrating haptic feeling presenting device 100B which is a variation of haptic feeling presenting device 100A.

Haptic feeling presenting device 100B has the same configuration as haptic feeling presenting device 100A except for dampers 82. Therefore, a description the same as that for haptic feeling presenting device 100A is omitted here.

In haptic feeling presenting device 100A, dampers 81 have a rectangular parallelepiped shape and are disposed between holding part 60 (back surface 60*a*) and protruding portions 73 (front surfaces 73*a*) of accommodating base part 70 (see FIGS. 2 and 3).

On the other hand, in haptic feeling presenting device 100B of the present variation, as illustrated in FIG. 12, dampers 82 include first damper 82*a* and second damper 82*b*, and has an L-shaped section in the XZ plane.

As dampers 82, as in the case of dampers 81, it is possible to use an elastic body such as rubber, and in particular, it is preferable to use a silicone rubber or a butyl rubber that has little change in damping property due to a temperature change.

Similarly to dampers 81, first damper 82*a* is disposed such that the opposite end portions in the Z-direction are in contact with holding part 60 (back surface 60*a*) and protruding portion 73 (front surface 73*a*), respectively. The opposite end portions of first damper 82*a* in the Z-direction are in contact with back surface 60*a* and front surface 73*a* at all times, including when holding part 60 vibrates due to electromagnetic actuator 10 or disturbance.

In order to make such a contact state, first damper 82*a* is disposed to be sandwiched between back surface 60*a* and front surface 73*a* in a state of being compressed in a direction along the Z-direction, similarly to dampers 81. Also in this case, the thickness of non-compressed first damper 82*a* in the Z-direction is set to be larger than the gap between back surface 60*a* and front surface 73*a*. Then, when first damper 82*a* is sandwiched between back surface 60*a* and front surface 73*a*, first damper 82*a* is disposed between back surface 60*a* and front surface 73*a* while compressed.

Second damper 82*b* extends from an outer end portion of first damper 82*a* in the X-direction toward the positive side in the Z-direction. Second damper 82*b* is disposed between first side surface 60*b* of holding part 60 and first side surface 70*b* of accommodating base part 70 such that an inner surface of the second damper is in contact with first side surface 60*b* and an outer surface of the second damper is in contact with first side surface 70*b*. That is, second damper 82*b* makes contact with first side surface 60*b* that is a portion of holding part 60 that faces a direction other than the Z-direction that is the vibration direction.

In dampers 82, first damper 82*a* has the same advantages as those of dampers 81 described above. Second damper 82*b* also functions as an impact suppressing portion in the same manner as dampers 81 and first damper 82*a*. First damper 82*a* described above can restrict the movement range of holding part 60 in the Z-direction and suppress the impact in the direction along the Z-direction, and second damper 82*b* can restrict the movement range of holding part 60 in the X-direction and suppress the impact in the direction along the X-direction.

In the present variation, above-described dampers 82 limit the movement ranges of holding part 60 in the Z-direction and the X-direction, and it is thus possible to suppress the impact on elastic parts 50 and prevent elastic parts 50 from being plastically deformed or damaged. Further, it is also possible to prevent touch panel 1 and holding part 60 from coming into contact with accommodating base part 70, and to prevent deformation and damage in touch panel 1, holding part 60, and accommodating base part 70.

Here, although the impact in the direction along the X-direction is suppressed by second damper 82*b* extending from the outer end portion of first damper 82*a* in the X-direction to the positive side in the Z-direction, a third damper extending from the outer end portion of first damper 82*a* in the Y-direction to the positive side in the Z-direction may be further disposed. The third damper is disposed between second side surface 60*c* (see FIG. 2) of holding part 60 and second side surface 70*c* of accommodating base part 70 such that an inner surface of the third damper is in contact with second side surface 60*c* and an outer surface of the third damper is in contact with second side surface 70*c*. The third damper is a contact portion in the present invention.

Similarly to second damper 82*b*, the third damper also functions as an impact suppressing portion, and can restrict a movement range of holding part 60 in the Y-direction, thereby suppressing an impact in the direction along the Y-direction.

Dampers 82 also including the third damper limit the movement ranges of holding part 60 in the X-direction, the Y-direction, and the Z-direction, and it is thus possible to suppress the impact on elastic parts 50 in different directions and prevent elastic parts 50 from being plastically deformed or damaged. Further, it is also possible to prevent touch panel 1 and holding part 60 from coming into contact with accommodating base part 70, and to prevent deformation and damage in touch panel 1, holding part 60, and accommodating base part 70.

Further, second damper 82*b* and the third damper may be out of contact with one or both of holding part 60 and accommodating base part 70, unlike first damper 82*a*, as long as the movable range of holding part 60 in the X-direction and the Y-direction can be limited.

[Variation 2 of Haptic Feeling Presenting Device]

Figure 13:
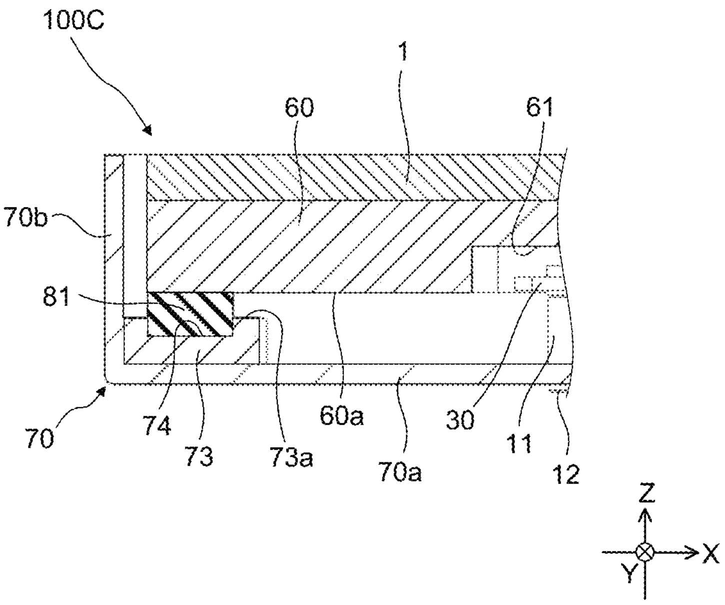
FIG. 13 is a partial sectional view illustrating a variation (Variation 2) of the haptic feeling presenting device according to the embodiment of the present invention.

FIG. 13 is a partial sectional view illustrating haptic feeling presenting device 100C which is a variation of haptic feeling presenting device 100A.

Haptic feeling presenting device 100C has the same configuration as haptic feeling presenting device 100A except for the arrangement configuration of dampers 81. Therefore, a description the same as that for haptic feeling presenting device 100A will be omitted here.

In the present variation, each of protruding portions 73 of accommodating base part 70 has lower accommodating recessed portion 74 for accommodating damper 81 inside. Lower accommodating recessed portion 74 is a recessed portion of a rectangular opening recessed from front surface 73*a* to the back surface side of protruding portion 73. The lower side of damper 81 is inserted into lower accommodating recessed portion 74, and is disposed between back surface 60*a* of holding part 60 and lower accommodating recessed portion 74 of protruding portion 73.

Damper 81 has the effects described in the above embodiment. Further, since the lower side of damper 81 is inserted into lower accommodating recessed portion 74, the elastic deformation of damper 81 in the X-direction and the Y-direction is suppressed by lower accommodating recessed portion 74. Therefore, the vibrations of touch panel 1, holding part 60, and movable body 40 can be dampened in a predetermined time, and thus a clear haptic feeling can be applied to the operator.

Further, since the lower side of damper 81 is inserted into lower accommodating recessed portion 74, it is possible to limit the movement range of holding part 60 in the X-direction and the Y-direction when damper 81 is fixed to holding part 60. As a result, it is possible to prevent plastic deformation and damage of elastic parts 50, and deformation and breakage of touch panel 1, holding part 60, and accommodating base part 70.

[Variation 3 of Haptic Feeling Presenting Device]

Figure 14:
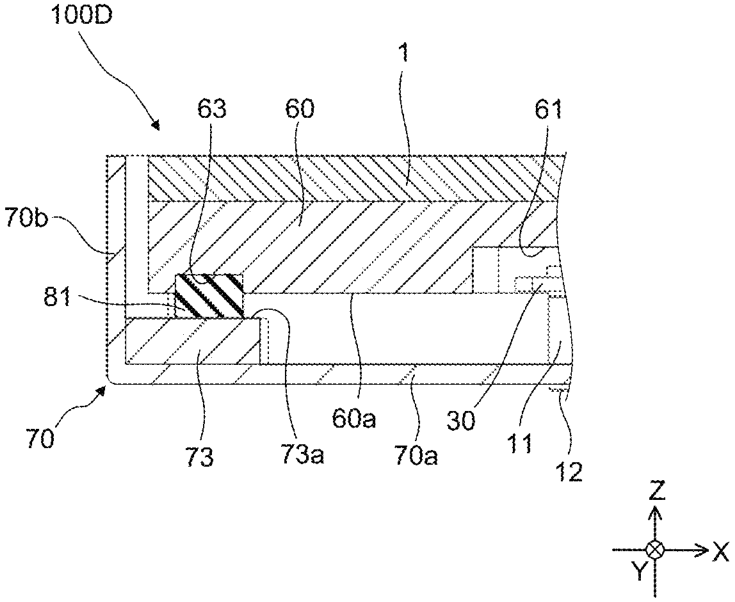
FIG. 14 is a partial sectional view illustrating a variation (Variation 3) of the haptic feeling presenting device according to the embodiment of the present invention.

FIG. 14 is a partial sectional view illustrating haptic feeling presenting device 100D which is a variation of haptic feeling presenting device 100A.

Haptic feeling presenting device 100D has the same configuration as haptic feeling presenting device 100A except for the arrangement configuration of dampers 81. Therefore, a description the same as that for haptic feeling presenting device 100A will be omitted here.

In the present variation, holding part 60 has upper accommodating recessed portion 63 for accommodating damper 81 inside. Upper accommodating recessed portion 63 is a recessed portion of a rectangular opening recessed from back surface 60*a* of holding part 60 toward the front surface side. The upper side of damper 81 is inserted into back surface 60*a* of holding part 60, and is disposed between upper accommodating recessed portion 63 of holding part 60 and front surface 73*a* of protruding portions 73.

Damper 81 has the effects described in the above embodiment. Further, since the upper side of damper 81 is inserted into upper accommodating recessed portion 63, the elastic deformation of damper 81 in the X-direction and the Y-direction is suppressed by upper accommodating recessed portion 63. Therefore, the vibrations of touch panel 1, holding part 60, and movable body 40 can be dampened in a predetermined time, and thus a clear haptic feeling can be applied to the operator.

Further, since the upper side of damper 81 is inserted into upper accommodating recessed portion 63, the movement range of holding part 60 in the X-direction and the Y-direction can be limited when damper 81 is fixed to protruding portions 73. As a result, it is possible to prevent plastic deformation and damage of elastic parts 50, and deformation and breakage of touch panel 1, holding part 60, and accommodating base part 70.

While haptic feeling presenting device 100C has lower accommodating recessed portion 74 for accommodating the lower side of damper 81, and haptic feeling presenting device 100D has upper accommodating recessed portion 63 for accommodating the upper side of dampers 81, but a haptic feeling presenting device may be configured to have both lower accommodating recessed portion 74 and upper accommodating recessed portion 63. In this case, damper 81 is disposed between lower accommodating recessed portion 74 and upper accommodating recessed portion 63.

In this way, since the opposite end portions of damper 81 in the Z-direction are inserted into lower accommodating recessed portion 74 and upper accommodating recessed portion 63, respectively, the elastic deformation of damper 81 in the X-direction and the Y-direction is suppressed by lower accommodating recessed portion 74 and upper accommodating recessed portion 63. Therefore, the vibrations of touch panel 1, holding part 60, and movable body 40 can be dampened in a predetermined time, and thus a clear haptic feeling can be applied to the operator.

Further, since the opposite end portions of damper 81 in the Z-direction are inserted into lower accommodating recessed portion 74 and upper accommodating recessed portion 63, respectively, the movement range of holding part 60 in the X-direction and the Y-direction can be limited. As a result, it is possible to prevent plastic deformation and damage of elastic parts 50, and deformation and breakage of touch panel 1, holding part 60, and accommodating base part 70.

[Variation 4 of Haptic Feeling Presenting Device]

Figure 15:
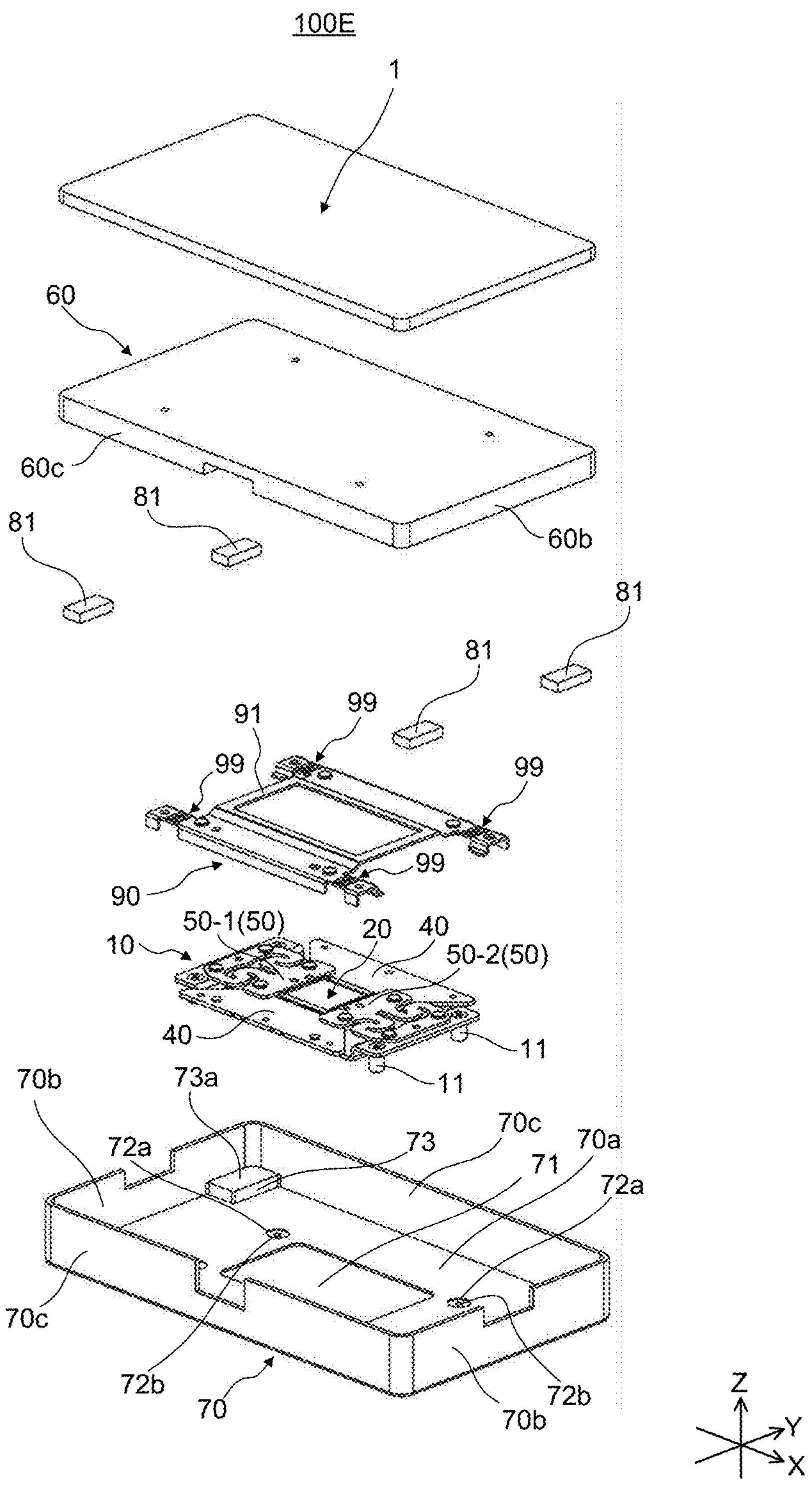
FIG. 15 is an exploded perspective view illustrating a variation (Variation 4) of the haptic feeling presenting device according to the embodiment of the present invention.
Figure 16:
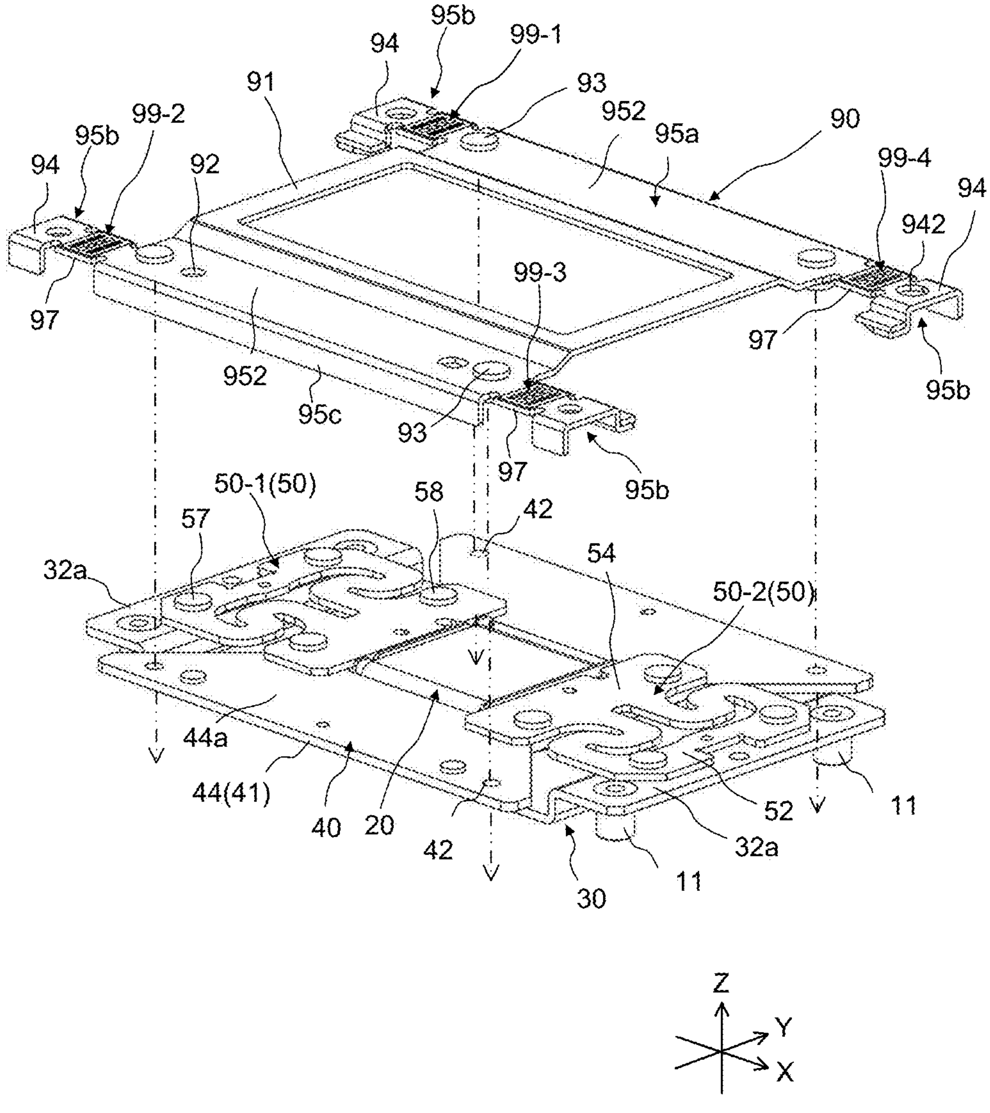
FIG. 16 is an enlarged view of the vibration actuator and a load detecting part of the haptic feeling presenting device illustrated in FIG. 15.

FIG. 15 is an exploded perspective view illustrating haptic feeling presenting device 100E which is a variation of haptic feeling presenting device 100A. FIG. 16 is an enlarged view of electromagnetic actuator 10 and load detecting part 90 of haptic feeling presenting device 100E illustrated in FIG. 15.

Haptic feeling presenting device 100E further includes load detecting part 90 in addition to haptic feeling presenting device 100A. Haptic feeling presenting device 100E has the same configuration as haptic feeling presenting device 100A except that it includes load detecting part 90. Therefore, a description the same as that for haptic feeling presenting device 100A will be omitted here.

<Load Detecting Part>

Load detecting part 90 is disposed integrally on movable body 40 of electromagnetic actuator 10, is interposed between movable body 40 and holding part 60, and is fixed to movable body 40 and holding part 60.

Load detecting part 90 includes straining member 91 and strain detecting parts 99 disposed on straining member 91. Load detecting part 90 detects a strain generated in straining member 91 by strain detecting parts 99 in response to a pressing operation of touch panel 1. The detected strain is outputted to a device control part of haptic feeling presenting device 100E (see FIG. 19), and the device control part drives electromagnetic actuator 10 in response to the strain to generate vibrations.

<Straining Member>

Straining member 91 functions as a straining body that generates strain when an external force is applied by a pressing operation on touch panel 1.

Straining member 91 includes movable-body-side fixing portions 92 fixed to surface-portion fixing portion 44 of movable body 40, and holding-part-side fixing portions 94 fixed to holding part 60. Straining member 91 further includes strain portions 97 disposed between movable-body-side fixing portions 92 and holding-part-side fixing portions 94. Strain detecting parts 99 (strain sensors 99-1 to 99-4) are attached to strain portions 97, and a strain of strain portions 97 is detected.

In the present variation, straining member 91 is formed into a rectangular frame-like plate shape by processing a sheet metal. With this shape, the straining member is disposed to surround, at the back surface side of touch panel 1, a portion of touch panel 1 (for example, a center portion of an operation surface of touch panel 1) on which the pressing operation is performed, when fixed to holding part 60. In the present variation, straining member 91 is made of a sheet metal harder than elastic parts 50. In the present variation, straining member 91 is a plate-shaped spring plate member. Accordingly, even when vibrations are repeatedly applied, metal fatigue can be alleviated and reliability can be improved.

In straining member 91, connecting arm portions 95*b* are disposed to protrude along the extending direction of long side portions 952 from the four corners of main body frame portion 95*a* having a flat rectangular frame shape including the pair of long side portions 952 facing each other.

Straining member 91 has movable-body-side fixing portions 92 to be fixed to yoke 41 via screws 93 that are fastening members respectively disposed at portions of main body frame portion 95*a* to which base end portions of the connecting arm portions 95*b* are connected. Straining member 91 is fixed to surface-portion fixing portion 44 via movable-body-side fixing portions 92.

Connecting arm portions 95*b* are provided with strain portions 97 and holding-part-side fixing portions 94 in this order from the base end portions.

Connecting arm portions 95*b* include strain portions 97 between long side portions 952 of main body frame portion 95*a* and holding-part-side fixing portions 94, and strain portions 97 are provided with strain detecting parts 99 attached thereto.

In straining member 91 of the present variation, main body frame portion 95*a* is fixed to surface-portion fixing portion 44 of movable body 40, and holding-part-side fixing portions 94 are fixed to holding part 60. Thus, the function as a straining body is exhibited by strain portions 97. When holding-part-side fixing portions 94 are displaced, straining member 91 (particularly, strain portions 97) is pushed toward the bottom surface portion 32*b* side together with surface-portion fixing portion 44, and is strained in accordance with the deformation of elastic parts 50.

Straining member 91 has ribs 95*c* disposed along outer edge portions of long side portions 952 of main body frame portion 95*a* and perpendicular to main body frame portion 95*a*. Main body frame portion 95*a* is reinforced by ribs 95*c*.

In the present variation, holding-part-side fixing portions 94 of straining member 91 are fixed to holding part 60 via screws 62 (see FIG. 4) which are fastening members inserted into fixing holes 942. Thus, holding-part-side fixing portions 94 are joined to holding part 60 at portions surrounding the center of the operation surface of touch panel 1. Further, the positions of movable-body-side fixing portions 92 fixed to movable body 40 are an inner region surrounded by holding-part-side fixing portions 94.

<Strain Detecting Part>

Strain detecting parts 99 are disposed on strain portions 97 of straining member 91, and detect a strain generated by a load applied to straining member 91 as a straining body in order to drive electromagnetic actuator 10. Strain detecting parts 99 include, for example, strain sensors 99-1 to 99-4. Since strain sensors 99-1 to 99-4 are disposed on strain portions 97, they are arranged between movable-body-side fixing portions 92 and holding-part-side fixing portions 94, respectively.

As described above, in the present variation, straining member 91 provided with strain detecting parts 99 is formed of an integral spring plate material. As a result, the positional accuracy of the arrangement positions of strain sensors 99-1 to 99-4 on connecting arm portions 95*b* of straining member 91 can be improved, and the accuracy at the time of assembly can be improved. That is, unlike a case where connecting arm portions 95*b* as the straining body being a detection target in straining member 91 are formed from a plurality of separate parts, no variation occurs during assembly and it is thus possible to improve the assemblability.

Further, in the present variation, strain detecting parts 99 are disposed on strain portions 97 as the straining body in which a strain is detected by strain detecting parts 99. That is, strain detecting parts 99 and strain portions 97 are disposed between holding part 60 and movable body 40, that is, between movable-body-side fixing portions 92 and holding-part-side fixing portions 94.

Strain detecting parts 99 are thus not disposed in electromagnetic actuator 10, and straining member 91 is separate from elastic parts 50. Therefore, the mass of movable body 40 is not applied to a strain detection target, and the vibration specification of elastic parts 50 is also not affected. Accordingly, the design of electromagnetic actuator 10 is not difficult, and various specifications of electromagnetic actuator 10 can be realized.

Electromagnetic actuator 10 is fixed to holding part 60 via load detecting part 90 in which strain detecting parts 99 and straining member 91 are integrated. Here, after load detecting part 90 and electromagnetic actuator 10 are assembled separately and in parallel, load detecting part 90 is incorporated in electromagnetic actuator 10. As a result, compared with a configuration in which strain detecting parts 99 and straining member 91 are part of movable body 40, the assembly efficiency can be improved since assembly of electromagnetic actuator 10 after assembly of strain detecting parts 99, or a reverse process is not required.

When touch panel 1 is operated, strain sensors 99-1 to 99-4 detect, as the pushing amount of touch panel 1, the strain amount of strain portions 97 that are displaced together with movable body 40 (yoke 41). The detected strain is output to the device control part, and a driving current generated to represent a movement amount of movable body 40 corresponding to the detected strain is sent to energize coil 22, whereby core assembly 20 attracts and moves yoke 41.

The present variation includes the device control part that determines the amount of movement of movable body 40 by using the strain detected by strain sensors 99-1 to 99-4 and realizes vibration feedback with respect to touch, but the present invention is not limited thereto. The device control part may detect a pushing amount with respect to elastic parts 50 in accordance with an actual movement amount of the operation equipment by using another sensor capable of detecting a touch of the operator on the operation equipment, and may realize a more natural feeling expression by using this detection result.

Further, a cycle of vibration of movable body 40 (which may also include touch panel 1) generated when the driving current pulse is supplied may be adjusted based on the detection result obtained by detecting the touch operation of the operator, that is, the pushing amount of movable body 40 using strain sensors 99-1 to 99-4. Further, besides strain sensors 99-1 to 99-4, an operation signal indicating an operation state may be output to the device control part so as to generate vibration in conjunction with and corresponding to a display form at the position of touch by the operator sensed on touch panel 1, and the device control part may perform control in accordance with such an operation signal.

Strain sensors 99-1 to 99-4 may be disposed at a single position among strain portions 97 in straining member 91, that is, at a single position among the portions between movable-body-side fixing portions 92 and holding-part-side fixing portions 94, but are preferably disposed at a plurality of positions. Since electromagnetic actuator 10 is attached to touch panel 1 in the present variation, it is preferable to dispose the strain sensors at least three or more positions to radially surround the center of the operation surface of touch panel 1 at regular intervals. As a result, electromagnetic actuator 10 can accurately detect the displacement of touch panel 1 subjected to a press operation in a planar manner.

In the present variation, strain sensors 99-1 to 99-4 are disposed on four strain portions 97 in the vicinity of holding-part-side fixing portions 94 which are positions for fixation to holding part 60. As a result, strain sensors 99-1 to 99-4 detect the strain at corner portions of a frame shape surrounding the center of a pressing operation region of touch panel 1. Therefore, when a rectangular touch panel display is used as a vibration presenting part as in touch panel 1, electromagnetic actuator 10 can be mounted on the display in a well-balanced manner via load detecting part 90. This makes it possible to stably align a strain direction of straining member 91 to the direction perpendicular to the plane.

Figure 17:
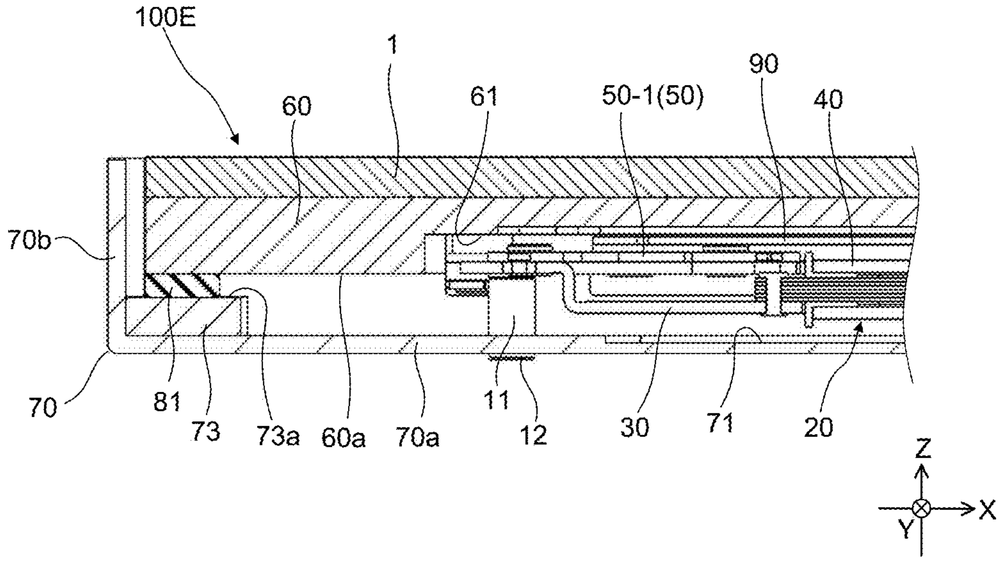
FIG. 17 is a partial sectional view illustrating a principal part configuration of the haptic feeling presenting device illustrated in FIG. 15.

FIG. 17 is a partial sectional view illustrating a configuration of a principal part of haptic feeling presenting device 100E.

Similarly to haptic feeling presenting device 100A described above, haptic feeling presenting device 100E also includes dampers 81 disposed between back surface 60*a* and front surfaces 73*a*. Dampers 81 and the configuration related to dampers 81 are the same as that described in the above-described embodiment including the effects, and therefore, repetitive description thereof will be omitted here.

Note that, in the present variation, the dampers and the configuration related to the dampers have the same configuration as in haptic feeling presenting device 100A described above, but the configuration described in Variations 1 to 3 may be adopted instead of such a configuration.

Figure 18:
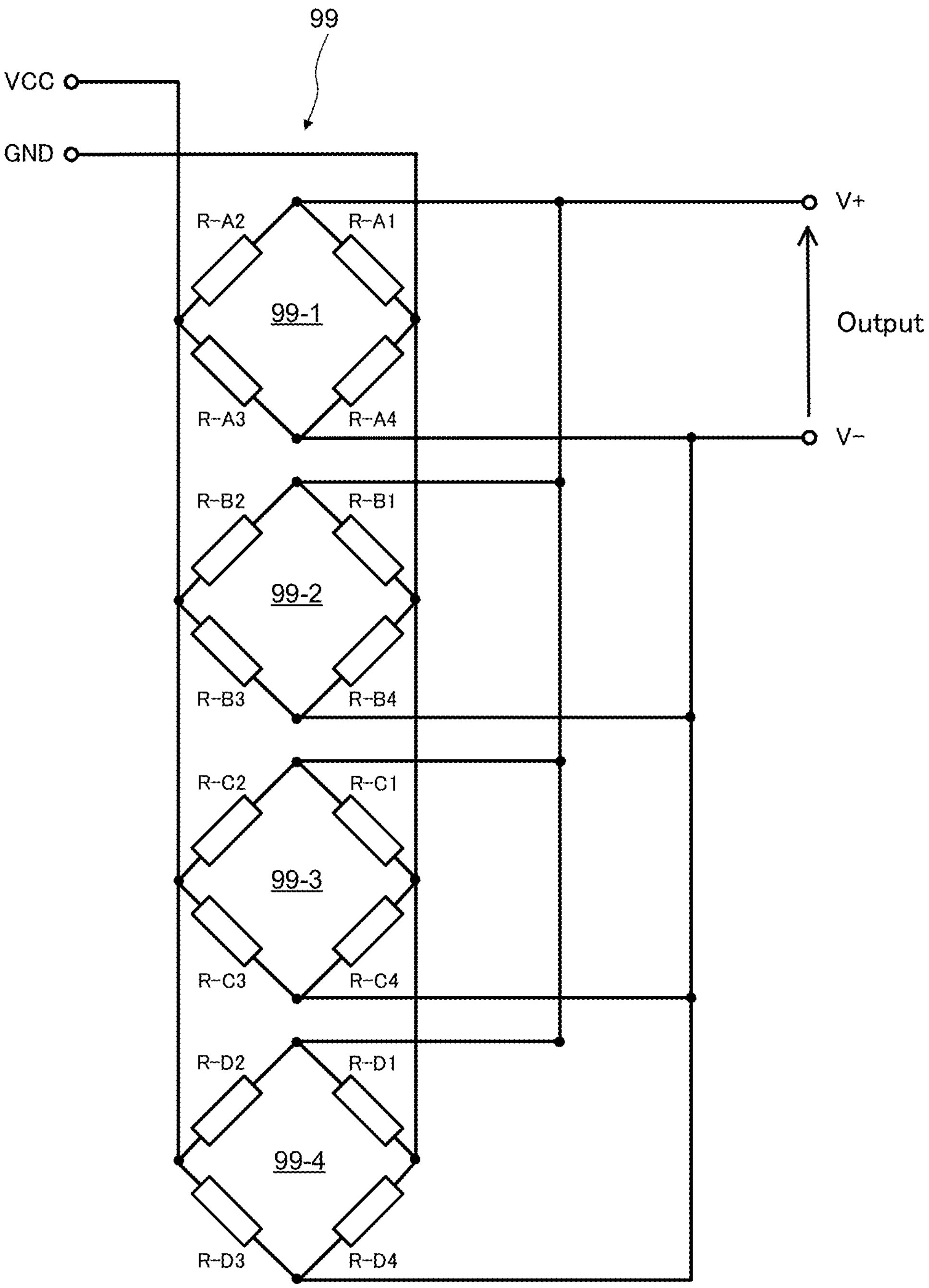
FIG. 18 illustrates interconnections of the load detecting part illustrated in FIG. 15.

FIG. 18 illustrates interconnections of strain detecting parts 99. Strain sensors 99-1 to 99-4 are disposed on straining member 91 and are located on the same plane. Strain sensors 99-1 to 99-4 have a plurality of respective strain gages (R-A1 to R-A4, R-B1 to R-B4, R-C1 to R-C4, and R-D1 to R-D4) and are full-bridge connected strain sensors.

Strain sensors 99-1 to 99-4 are connected in parallel to power supply voltage Vcc, to GND, and to one another, and are connected to one another so as to output the amount of change in electric resistance value that changes upon application of a load. With this configuration, the outputs from strain sensors 99-1 to 99-4 are averaged, and a stable behavior is achieved. In addition, output values may vary depending on the temperature in each of strain sensors 99-1 to 99-4, and the temperature dependence can be relaxed by averaging. Thus, the temperature-dependent behavior stability and the reliability can be improved.

Further, since strain sensors 99-1 to 99-4 are composed of thin-film strain gauges as illustrated in FIG. 16, a module integrated with straining member 91 can be obtained. Therefore, mountability and manufacturability of load detecting part 90 including strain sensors 99-1 to 99-4 and straining member 91 can be improved.

<Apparatus Control Part of Haptic Feeling Presenting Device>

Figure 19:
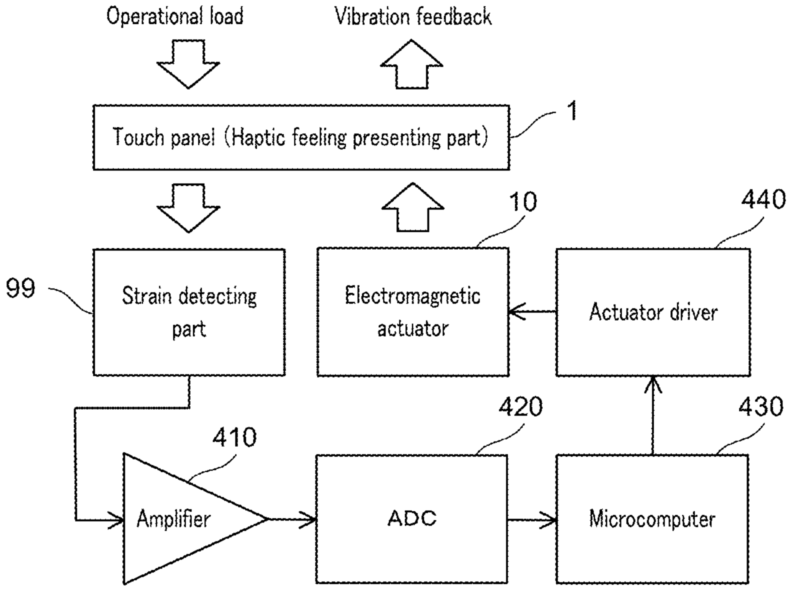
FIG. 19 schematically illustrates a device control part of the haptic feeling presenting device illustrated in FIG. 15.

FIG. 19 schematically illustrates the device control part of haptic feeling presenting device 100E.

Haptic feeling presenting device 100E includes touch panel 1 being an exemplary haptic feeling presenting part, strain detecting part 99, amplifier (amplification part) 410, AD converter (ADC) 420, microcomputer 430, actuator driver 440, and electromagnetic actuator 10.

For example, it is assumed that touch panel 1 includes a touch position detecting part (not illustrated) that receives a touch operation by an operator on touch panel 1 and outputs the touch position. A signal from the touch position detecting part (not illustrated) is output to microcomputer 430. Strain detecting parts 99 detect a strain in straining member 91 at strain detecting parts 99 when touch panel 1 is pressed, and the detected strain signal is input to microcomputer 430 via amplifier 410 and ADC 420.

Microcomputer 430 controls actuator driver 440 so that vibration corresponding to the touch operation is generated in response to the input signal, that is, the touch position information, a drive timing, and the strain signal from the touch position detecting part. That is, microcomputer 430 outputs an actuator drive signal to electromagnetic actuator 10 via actuator driver 440 to supply a drive current.

Electromagnetic actuator 10, which has received the actuator drive signal input from actuator driver 440, transmits vibration to touch panel 1 to vibrate the touch panel, thereby causing touch panel 1 to present vibration corresponding to the touch position output from touch panel 1. In this way, electromagnetic actuator 10 is driven in response to the operation of the operator received on touch panel 1.

When the actuator drive signal is input, electromagnetic actuator 10 moves movable body 40, specifically, yoke 41 and straining member 91 toward the negative side in the Z-direction, which is one direction against the biasing force, by the magnetic attraction force.

When the input of the actuator drive signal to electromagnetic actuator 10 is stopped, electromagnetic actuator 10 releases the biasing force and causes movable body 40 to move toward the other direction side (the positive side in the Z-direction) by the biasing force. Electromagnetic actuator 10 vibrates movable body 40, holding part 60, and touch panel 1 by inputting and stopping the actuator drive signal. Electromagnetic actuator 10 drives movable body 40 without using a magnet to vibrate touch panel 1.

In the present variation, the actuator drive signal corresponds to a plurality of drive current pulse trains (also referred to as "current pulse trains") supplied to coil 22 as a drive current for driving movable body 40, holding part 60, and touch panel 1. In electromagnetic actuator 10, when the current pulse trains are supplied to coil 22, the movable body moves in one direction. By repeating this, the movable body vibrates.

In this way, haptic feeling presenting device 100E of the present variation can reproduce a realistic haptic feeling expression such as a haptic feeling for a push button or a switch with a realistic haptic feeling expression based on the detection result by strain detecting parts 99, and can enhance the operating feeling.

Embodiments and variations of the present invention have been described above. It should be noted that the above description is illustrative of a preferred embodiment of the present invention, and the scope of the present invention is not limited thereto. That is, the configuration of the device and the shape of each part are merely an example, and it is obvious that various variations and additions to these examples are possible within the scope of the present invention.

For example, in the present embodiment, the driving direction of movable body 40 (touch panel 1 and holding part 60) of electromagnetic actuator 10 is the Z-direction, but the present invention is not limited thereto. For example, even when the driving direction is the X-direction or the Y-direction, the above-described effects such as the haptic feeling improvement can be obtained.

The disclosure of Japanese Patent Application No. 2021-210880, filed on Dec. 24, 2021, including the specification, drawings and abstract, is incorporated herein by reference in its entirety.

INDUSTRIAL APPLICABILITY

The haptic feeling presenting device according to the present invention can suppress persistence of vibration to improve a haptic feeling, and is useful for, for example, operation equipment such as a touch display device on which a touch panel device is mounted.

REFERENCE SIGNS LIST

1 Touch panel
10 Electromagnetic actuator
11 Support column
12 Screw
20 Core assembly
20*a*, 20*b* Opposing surface
22 Coil
24 Core
26 Bobbin
26*a*, 26*b* Divided body
28 Fixing hole
29 Screw
30 Fixed body
32 Base part
32*a* Attachment portion
32*b* Bottom surface portion
33 Fastening hole
36 Opening portion
40 Movable body
41 Yoke
42 Surface-portion fixing hole
44 Surface-portion fixing portion
44*a* Fixing surface
46, 47 Attracted surface portion
48 Opening portion
49 Cutout portion
50, 50-1, 50-2 Elastic part
52 Fixed-body-side fixing portion
54 Movable-body-side fixing portion
56 Serpentine-shaped elastic arm portion
57, 58 Screw
60 Holding part
60*a* Back surface
60*b* First side surface
60*c* Second side surface
61 Upper recessed portion
62 Screw
63 Upper accommodating recessed portion
70 Accommodating base part
70*a* Bottom portion
70*b* First side surface
70*c* Second side surface
71 Lower recessed portion
72*a* Insertion hole
72*b* Through hole

73 Protruding portion
73*a* Front surface
74 Lower accommodating recessed portion
81, 82 Damper
82*a* First damper
82*b* Second damper
90 Load detecting part
91 Straining member
92 Movable-body-side fixing portion
93 Screw
94 Holding-part-side fixing portion
95*a* Main body frame portion
95*b* Connecting arm portion
95*c* Rib
97 Strain portion
99 Strain detecting part
99-1, 99-2, 99-3, 99-4 Strain sensor
100A, 100B, 100C, 100D, 100E Haptic feeling presenting device
110 Drive control section
111 Switching element
120 Signal generation
241 Core main body
242, 244 Magnetic pole portion
321, 322 Fixing hole
410 Amplifier
420 ADC
430 Microcomputer
440 Actuator driver
942 Fixing hole
952 Long side portion

The invention claimed is:

1. A haptic feeling presenting device, comprising:
a holding part capable of holding operation equipment on which a touch operation by an operator is performed;
a vibration actuator that includes a movable body supporting the holding part, and a fixed body supporting the movable body such that the movable body is capable of elastically vibrating in a vibration direction, the vibration actuator being configured to drive the movable body in one direction of the vibration direction to generate a vibration as a haptic feeling applied to the operator via the operation equipment;
a base part to which the fixed body of the vibration actuator is fixed; and
a damper disposed in contact with each of the holding part and the base part, wherein
the operation equipment is a touch panel, and
the holding part has a higher rigidity than the touch panel.

2. The haptic feeling presenting device according to claim 1, wherein
the damper is sandwiched between the holding part and the base part while compressed in a direction along the vibration direction.

3. The haptic feeling presenting device according to claim 1, wherein
the vibration direction is a direction perpendicular to an operation surface of the operation equipment.

4. The haptic feeling presenting device according to claim 1, wherein
the damper is disposed in contact with a portion of the holding part facing a direction different from the vibration direction.

5. The haptic feeling presenting device according to claim 1, wherein:
the haptic feeling presenting device comprises three or more of the dampers, and
the three or more dampers are disposed to surround a center of gravity of the operation equipment, the holding part, and the movable body.

6. The haptic feeling presenting device according to claim 1, wherein:
the holding part and the base part are rectangular, and
the damper is disposed on at least one of four corners of the holding part and the base part.

7. The haptic feeling presenting device according to claim 1, wherein
the damper is a silicone rubber or a butyl rubber.

8. The haptic feeling presenting device according to claim 1, wherein:
the vibration actuator includes an elastic supporting part for elastically supporting the movable body with respect to the fixed body, and
the elastic supporting part is a serpentine-shaped leaf spring.

9. The haptic feeling presenting device according to claim 1, further comprising:
a load detecting part disposed between the holding part and the movable body and configured to detect a load applied to the operation equipment, and
the movable body is driven based on a detection result of the load detecting part.

10. The haptic feeling presenting device according to claim 9, wherein
the load detecting part includes a strain gauge.

11. A haptic feeling presenting device, comprising:
a holding part capable of holding operation equipment on which a touch operation by an operator is performed;
a vibration actuator that includes a movable body supporting the holding part, and a fixed body supporting the movable body such that the movable body is capable of elastically vibrating in a vibration direction, the vibration actuator being configured to drive the movable body in one direction of the vibration direction to generate a vibration as a haptic feeling applied to the operator via the operation equipment;
a base part to which the fixed body of the vibration actuator is fixed; and
a damper disposed in contact with each of the holding part and the base part, wherein
at least one of the holding part and the base part includes an accommodating recessed portion for accommodating an end portion of the damper.

12. A haptic feeling presenting device, comprising:
a holding part capable of holding operation equipment on which a touch operation by an operator is performed;
a vibration actuator that includes a movable body supporting the holding part, and a fixed body supporting the movable body such that the movable body is capable of elastically vibrating in a vibration direction, the vibration actuator being configured to drive the movable body in one direction of the vibration direction to generate a vibration as a haptic feeling applied to the operator via the operation equipment;
a base part to which the fixed body of the vibration actuator is fixed; and
a damper disposed in contact with each of the holding part and the base part, wherein
a thickness of the damper in an uncompressed state in the vibration direction is larger than a gap between the holding part and the base part.

* * * * *